United States Patent
Göbelt et al.

(10) Patent No.: US 9,573,103 B2
(45) Date of Patent: *Feb. 21, 2017

(54) METHOD FOR PRODUCING DISPERSANT ADDITIVES

(75) Inventors: Bernd Göbelt, Wesel (DE); René Nagelsdiek, Hamminkeln (DE); Jürgen Omeis, Dorsten-Lembeck (DE); Frederik Piestert, Wesel (DE); Wolfgang Pritschins, Wesel (DE); Natasa Meznaric, Duisburg (DE); Daniela Schröder, Rheinberg (DE); Werner Tiegs, Rees (DE)

(73) Assignee: BYK-Chemie GmbH, Wesel (DE)

( * ) Notice: Subject to any disclaimer, the term of this patent is extended or adjusted under 35 U.S.C. 154(b) by 31 days.

This patent is subject to a terminal disclaimer.

(21) Appl. No.: 14/127,861

(22) PCT Filed: May 5, 2012

(86) PCT No.: PCT/EP2012/001944
§ 371 (c)(1),
(2), (4) Date: Feb. 27, 2014

(87) PCT Pub. No.: WO2012/175159
PCT Pub. Date: Dec. 27, 2012

(65) Prior Publication Data
US 2014/0194537 A1    Jul. 10, 2014

(30) Foreign Application Priority Data
Jun. 22, 2011   (EP) ..................... 11005095

(51) Int. Cl.
| | |
|---|---|
| *C08G 18/10* | (2006.01) |
| *B01F 17/00* | (2006.01) |
| *C08G 18/08* | (2006.01) |
| *C08G 18/28* | (2006.01) |
| *C08G 18/32* | (2006.01) |
| *C08G 18/61* | (2006.01) |
| *C08G 18/76* | (2006.01) |
| *C08G 18/80* | (2006.01) |
| *C08G 18/83* | (2006.01) |
| *C08K 5/5455* | (2006.01) |
| *C09D 7/02* | (2006.01) |

(52) U.S. Cl.
CPC ......... *B01F 17/0092* (2013.01); *B01F 17/005* (2013.01); *B01F 17/0042* (2013.01); *B01F 17/0064* (2013.01); *C08G 18/0814* (2013.01); *C08G 18/0819* (2013.01); *C08G 18/0823* (2013.01); *C08G 18/10* (2013.01); *C08G 18/282* (2013.01); *C08G 18/283* (2013.01); *C08G 18/284* (2013.01); *C08G 18/2825* (2013.01); *C08G 18/2865* (2013.01); *C08G 18/2875* (2013.01); *C08G 18/3275* (2013.01); *C08G 18/3281* (2013.01); *C08G 18/61* (2013.01); *C08G 18/615* (2013.01); *C08G 18/7621* (2013.01); *C08G 18/8064* (2013.01); *C08G 18/836* (2013.01); *C08K 5/5455* (2013.01); *C09D 7/02* (2013.01)

(58) Field of Classification Search
CPC ............ C08G 18/0814; C08G 18/0823; C08G 18/283; C08G 18/284; C08G 18/2875; B01F 17/0092
See application file for complete search history.

(56) References Cited

U.S. PATENT DOCUMENTS

| | | |
|---|---|---|
| 4,032,698 A | 6/1977 | Ashe |
| 4,101,529 A | 7/1978 | Ammons |
| 4,777,195 A | 10/1988 | Hesse et al. |
| 4,795,796 A | 1/1989 | Haubennestel et al. |
| 4,942,213 A | 7/1990 | Haubennestel et al. |
| 5,130,463 A | 7/1992 | Haubennestel et al. |
| 5,910,556 A | 6/1999 | Wamprecht et al. |
| 6,111,054 A | 8/2000 | Haubennestel et al. |
| 6,875,897 B1 | 4/2005 | Lange et al. |
| 2002/0115882 A1* | 8/2002 | Haubennestel ...... C08G 18/282 560/27 |
| 2005/0250927 A1 | 11/2005 | Pritschins et al. |
| 2007/0259120 A1 | 11/2007 | Haubennestel et al. |
| 2010/0324206 A1 | 12/2010 | Richards et al. |
| 2011/0021699 A1* | 1/2011 | Pritschins ............ C08G 18/283 524/875 |

FOREIGN PATENT DOCUMENTS

| | | | | |
|---|---|---|---|---|
| DE | WO 2009103543 A1 * | 8/2009 | .......... | C08G 18/283 |
| EP | 0 318 999 A2 | 6/1989 | | |
| EP | 0 826 753 A1 | 3/1998 | | |
| EP | 0 893 155 A2 | 1/1999 | | |
| EP | 1 593 700 A1 | 11/2005 | | |
| EP | 1 837 355 A2 | 9/2007 | | |
| WO | WO 2008/070601 A2 | 6/2008 | | |

OTHER PUBLICATIONS

PCT/EP2012/001944—International Search Report, Jul. 24, 2012.
PCT/EP2012/001944—Written Opinion of the International Searching Authority, Jul. 24, 2012.
PCT/EP2012/001944—International Preliminary Report on Patentability, Sep. 30, 2013.
Aurelia Grob, et al., "Synthesis and Copolymerization of Macromonomers based on 2-nonyl- and 2-phenyl-2-oxazoline", Macromol. Chem. Phys., Sep. 1996, vol. 197, Issue 9, pp. 2811-2826, Wiley. (Abstract).

* cited by examiner

Primary Examiner — Michael L Leonard
(74) Attorney, Agent, or Firm — Curatolo Sidoti Co., LPA; Joseph G. Curatolo; Salvatore A. Sidoti

(57) ABSTRACT

The present invention relates to a method for producing an additive composition which in particular contains specific urea urethanes. The additive composition is extremely suitable as a wetting agent and dispersant.

30 Claims, No Drawings

METHOD FOR PRODUCING DISPERSANT ADDITIVES

CROSS REFERENCE TO RELATED APPLICATIONS

This application is a national stage application of International Application No. PCT/EP2012/001944, filed 5 May 2012, which claims priority from European Patent Application No. 11005095.2, filed 22 Jun. 2011, from which applications priority is claimed, and which are incorporated herein by reference.

The present invention relates to a method for producing an additive composition, the additive composition, the use of the additive composition, a solid mixture, as well as a paint, and a plastic.

Wetting agents which are present in a liquid in dissolved or dispersed form, reduce the surface tension or the interfacial tension, and thus increase the wetting capacity of the liquid. In many cases wetting agents allow only ever surface wetting in this way.

Dispersants are generally suitable for the stabilization of solids in binders, paints, pigment pastes, plastics and plastic mixtures, adhesives and sealants, to reduce the viscosity of such systems and to improve the flow properties. Dispersion stabilizers are used to stabilize dispersions already generated.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic and/or neutral structure. These substances, in a small amount, are either applied directly to the solid or added to the dispersing medium. It is also important that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration there are unwanted effects such as viscosity increase in liquid systems, shade drift and losses of gloss in paints and coatings, and the reduction of mechanical strength and material homogeneity in plastics.

Suitable wetting and dispersing agents in practice include various types of compounds. This is particularly due to the fact that a large number of different systems exists which are based in particular on various binders combined with different particles to be dispersed, such as pigments, fillers and fibers.

EP 0 826 753 A describes a production method for a polyisocyanate adduct mixture-based dispersant. The method has low selectivity, inter alia, because undesired (e.g., cross-linked by-products) form due to an excess of isocyanate, which, with respect to the quality of the dispersant result in a deteriorated compatibility and an undesirably high viscosity.

WO 2008/070601 A also describes a lithe selective, one-step synthesis of a polyisocyanate mixture which as dispersant, inter alia, has also the foregoing disadvantages due to high product heterogeneity.

EP 1,837,355 A and EP 1,593,700 A each describe the production of branched, biuret group-containing adducts which are produced by addition to uretdione groups. Such adducts are proven dispersants, which, however, are often not optimal with respect to compatibility, solubility and viscosity.

U.S. Pat. No. 5,130,463 A relates to the production of specific phosphoric acid esters, which are regarded as high-quality wetting agents and dispersants. However, these phosphoric acid esters are not the optimum and complete solution for many dispersing tasks, in particular due to limited universality with respect to the solids to be dispersed.

The object of the present invention was thus to provide a method for the production of high quality, and most universally applicable dispersant additives.

The solution of this object is a method for producing an additive composition comprising the steps i) to iii), wherein in step i) a hydroxy component of the general formula (I)

$$Y(-OH)_q \qquad (I)$$

wherein
Y is the same or different and is represented by a branched or unbranched, saturated or unsaturated organic radical having 1 to 1000 carbon atoms,
q is the same or different and represented by an integer from 1 to 10 is reacted with a diisocyanate of the general formula (II) having NCO groups of different reactivity

$$R^1(NCO)_2 \qquad (II)$$

wherein
$R^1$ is the same or different and is represented by a branched or unbranched, saturated or unsaturated organic radical having 6 to 20 carbon atoms,
wherein the diisocyanate of the general formula (II) is used with respect to the hydroxy component of the general formula (I) in a molar ratio of at least (1.1*arithmetic mean of q):1.0, so that an isocyanate adduct of the general formula (III)

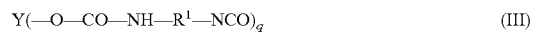

$$Y(-O-CO-NH-R^1-NCO)_q \qquad (III)$$

wherein
Y, q and $R^1$ are each as described above,
and unreacted diisocyanate of the general formula (II) containing reaction mixture is formed, in step ii) at least 50 mol % of the unreacted portion of the diisocyanate of the general formula (II) is removed from the reaction mixture (suitably preferably by distillation), in step iii) a compound of the general formula (IV) having at least one head group radical $Z^1$

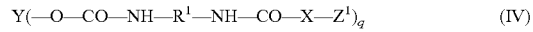

$$Y(-O-CO-NH-R^1-NH-CO-X-Z^1)_q \qquad (IV)$$

wherein
Y, q and $R^1$ are each as described above,
X is the same or different and is represented by O, NH and/or $NZ^2$
wherein
$Z^2$ is the same or different and is represented by a branched or unbranched, saturated or unsaturated organic radical,
$Z^1$ is the same or different and is represented by a branched or unbranched, saturated or unsaturated organic radical having at least two carbon atoms having at least one head group which is present in salifiable or salified form (the presence of the head groups in non-salified, salified and/or partially salified form is typically also dependent on the respective chemical environment (pH value)), and is selected from the group consisting of tertiary amino functions, quaternary ammonium functions, phosphoric acid ester functions, and carboxylic acid functions, wherein step iii) is carried out in a single stage iii-a) or a sequence of steps iii-b), in step iii-a) the isocyanate adduct of the general formula (III) present in the reaction mixture is reacted with an isocyanate-reactive compound of general formula (V) having said head group radical $Z^1$, $$HX\!-\!Z^1 \qquad (V)$$

wherein

X and $Z^1$ are each as described above, and in the sequence of steps iii-b), first, the isocyanate adduct of the formula (III) which is present in the reaction mixture is reacted with a compound having a isocyanate-reactive group HX and at least one further functional group Q, wherein then Q is reacted with a reagent involved in the generation of the head group radical $Z^1$ to form the head group radical $Z^1$.

The characters * above means multiplied (with).

The phrase "the same or different" is intended to mean that the respective number, the respective radical, substituent or molecular component may vary, both within a (macro) molecular or between different (macro)molecular species of the same general formula.

In the general formula (I), Y must be regarded as an organic radical having 1 to 10 hydroxyl groups. Y typically contains at least as many carbon atoms as hydroxyl groups.

The fact that q may be the same or different, means that also mixtures of different species can be used, which each differ by the value of q.

The term "arithmetic mean of q" is intended to mean that an arithmetic mean of q is taken as a basis, which is formed from all of the q-values of the individual isocyanate adducts within the general formula (III). If, for example, q=2 is realized for exactly half of the isocyanate adduct species within general formula (III) and q=4 is realized for the corresponding other half of isocyanate adduct species within the general formula (III), the corresponding arithmetic mean would be equal to 3.

The use of the diisocyanate containing NCO-groups of different reactivity in a molar excess causes a higher selectivity to the effect that preferably exactly one NCO group of the diisocyanate is reacted in step i). The greater the molar excess of the diisocyanate, the higher is normally the selectivity in respect to the production of the isocyanate adduct of general formula (III) generated in step i). The unreacted diisocyanate as a result of its use in excess is removed accordingly from the reaction mixture at least partially (but preferably completely) to keep the proportion of the resulting by-product in step iii) (a diurea—where in step the reaction is carried out with an amine) as low as possible. However, the reaction carried out in step iii) of the remaining isocyanate group(s) of the isocyanate adduct of the general formula (III) should be also as complete as possible. Optimally, the additive composition produced is substantially free of isocyanate groups, and in particular substantially free of the diisocyanate employed.

It should be noted that the additive composition that can be produced by the method according to the invention has a good dispersion effect with respect to a wide range of solids to be dispersed. This manifests itself, inter alia, in the fact that solids with acidic, neutral and basic surfaces can be effectively dispersed.

The additive composition produced by the method according to the invention is of exceptionally high quality and can be used universally as a wetting agent and dispersant. Specifically, it can be said that the additive composition produced according to the invention can be used successfully both in polar and in nonpolar binder systems and thereby shows excellent compatibility as a wetting agent and dispersant or as dispersion stabilizers. This ensures the successful use in combination with a variety of binders and coating materials. Furthermore, the additive composition produced by the method according to the invention allows for a flocculation-free miscibility of pastes, especially pigment pastes or binders produced with these pastes. In addition, phosphoric acid derivatives according to the invention are suitable as dispersion stabilizers, especially as emulsion stabilizers. By the use of the additive composition produced by the method according to the invention, the viscosity of the ground material that is added is reduced significantly during dispersion and thus enables the production of formulations with high solids content. In this way, the proportion of (volatile) solvents can be reduced resulting in improved environmental compatibility. In summary it can be said that the additive composition produced by the method according to the invention reduce the viscosity of the ground material of corresponding paints, pastes or plastics formulations with good stabilization of pigments or fillers to an extent that processing at high filler content is possible without negatively impacting the resistance of the cured paint. Finally it should be mentioned that the implementation of the method according to the invention is relatively simple and economical, with starting materials used being generally readily available.

In a preferred embodiment, q is same or different and is represented by an integer of 1 to 5, preferably 1 and/or 2.

The parameter q largely determines the structure type of the compound obtained in step iii).

Species of the general formula (IV) with q>1, for example where q=2 to 5, improve, in general, in particular the anti-settling properties while species with lower "q value", in particular, where q=1, mostly contribute especially to the deflocculation behavior. In general it can be said that the larger q the more binding groups per molecule, and the stronger the adhesion of the molecule to solid surfaces in general.

Suitably (optionally exclusively), species of the general formula (I) (in the production method) or the general formula (IV) (in the application) each with q=1 should be used to optimize the deflocculation effect.

Thus, in a particularly preferred embodiment, q is 1, so that in the method including steps i) to iii)

in step i) as a hydroxy component a monohydroxy compound of the general formula (Ia)

$$Y\!-\!OH \qquad (Ia)$$

wherein

Y is the same or different and is represented by a branched or unbranched, saturated or unsaturated organic radical having 1 to 1000 carbon atoms is reacted with a diisocyanate of the general formula (II) having NCO groups of different reactivity $$R^1(NCO)_2 \qquad (II)$$

wherein $R^1$ is the same or different and is represented by a branched or unbranched, saturated or unsaturated organic radical having 6 to 20 carbon atoms, wherein the diisocyanate of the general formula (II) is used with respect to the monohydroxy component of the general formula (Ia) in a molar ratio of at least 1.1:1.0, so that a monoisocyanate adduct of the general formula (IIIa)

Y—O—CO—NH—R$^1$—NCO                      (IIIa)

wherein
Y and R$^1$ are each as described above,
and unreacted diisocyanate of the general formula (II) containing reaction mixture is formed,
in step ii) at least 50 mol % of the unreacted portion of the diisocyanate of the general formula (II) is removed from the reaction mixture,
in step iii) a compound of the general formula (IVa) having at least one head group radical Z$^1$

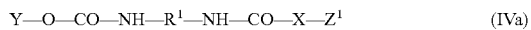

Y—O—CO—NH—R$^1$—NH—CO—X—Z$^1$                      (IVa)

wherein
Y and R$^1$ are each as described above,
X is the same or different and is represented by O, NH and/or NZ$^2$
wherein
Z$^2$ is the same or different and is represented by a branched or unbranched, saturated or unsaturated organic radical,
Z$^1$ is the same or different and is represented by a branched or unbranched, saturated or unsaturated organic radical having at least two carbon atoms having at least one head group which is present in salifiable or salified form, and is selected from the group consisting of tertiary amino functions, quaternary ammonium functions, phosphoric acid ester functions, and carboxylic acid functions,
wherein step iii) is carried out in a single stage iii-a) or a sequence of steps iii-b),
in step iii-a) the monoisocyanate adduct of the general formula (IIIa) present in the reaction mixture is reacted with an isocyanate-reactive compound of general formula (V) having said head group radical Z$^1$,

HX—Z$^1$                      (V)

wherein
X and Z$^1$ are each as described above,
and in the sequence of steps iii-b), first, the monoisocyanate adduct of the formula (III) which is present in the reaction mixture is reacted with a compound having a isocyanate-reactive group HX and at least one further functional group Q, wherein then Q is reacted with a reagent involved in the generation of the head group radical Z$^1$ to form the head group radical Z$^1$.

Thus, where a strong deflocculating effect of the product of the method, when used as a wetting agent and dispersant, is sought, accordingly (possibly exclusively) mono-alcohols Y—OH should be used.

Typically, Y contains at least one polyether radical, polyester radical, hydrocarbon radical, and/or polysiloxane radical.

Frequently, Y contains in total 1 to 450 ether oxygen atoms, which are preferably contained in ether oxygen-containing groups, which are derived from polytetrahydrofuran, polyoxethanes and/or polyoxiranes.

Typically, Y contains in total 3 to 400 ether oxygen atoms, wherein at least 50, preferably at least 80 mol % of the ether oxygen atoms are present in ethylene oxide and/or propylene structural units.

The alcohol used in the method according to the invention Y(—OH)$_q$ may include additional heteroatoms such as O, S, Si and/or N, or contain ether, urethane, carbonate, amide, urea and/or ester groups. Optionally, in groups Y, hydrogen is substituted by halogen (e.g., fluorine and/or chlorine). The radical Y may carry further groups such as C═C double bonds, which are inert in the formation of the addition product. The optionally present ester, ether, urethane, carbonate and/or siloxane groups can be present in a block structure (for example, poly(ethylene oxide-propylene oxide block-epsilon-caprolactone), may form a gradient, or may be randomly arranged.

Ether groups, or polyethers which may be present in Y include:

Mono-, di-, or polyhydroxy polyethers can be used also as Y—(OH)$_q$. These may be generated, for example, by alkoxylation of the compounds described above as Y—(OH)$_q$, such as alkanols, cycloalkanols, phenols, with alkylene oxides such as ethylene oxide, propylene oxide, butylene oxide, styrene oxide, aliphatic or aromatic glycidyl ethers, such as isopropyl glycidyl ether, butyl glycidyl ether, allyl glycidyl ether, 2-ethylhexyl glycidyl ether, cresyl glycidyl ether and phenyl glycidyl ether. Mixtures of these materials can be used also. In the case of mixed polyethers they may be arranged randomly, in gradient form or in blocks. These polyethers often have a number average molecular weight ($M_n$) in the range of about 100 to 25,000, more often from 150 to 15,000, and most typically from 200 to 10,000 g/mol. Preferred polyethers are those based on ethylene oxide, propylene oxide and mixtures thereof.

Examples include hydroxy-functional vinyl compounds, such as hydroxybutyl vinyl ether, monohydroxy-functional polyoxyalkylene monoalcohols such as allyl polyethers (e.g., polyglycol A 350, polyglycol A 500, polyglycol A 1100, polyglycol A 11-4, polyglycol A 20-10 or polyglycol A 20-20 of Clariant AG or Pluriol® A 010 R, Pluriol® A 11 RE, Pluriol® A 13 R, Pluriol® A 22 R or Pluriol® A 23 R of BASF AG), vinyl polyethers (such as polyglycol V 500, polyglycol V 1100 or polyglycol V 5500 of Clariant AG), methanol-initiated polyoxyethylene monoalcohols (such as Pluriol® A 350 E, Pluriol® A 500 E, Pluriol® A 750 E, Pluriol® A 1020 E, Pluriol® A 2000 E or Pluriol® A 5010 E of BASF AG), alkanol-initiated polyoxypropylene monoalcohols (such as polyglycol B01/20, polyglycol B01/40, polyglycol B01/80, polyglycol B01/120 or polyglycol B01/240 of Clariant AG or Pluriol® A 1350 P or Pluriol® A 2000 P of BASF AG) and polyalkoxylates having variable degrees of alkoxylation started with different fatty alcohols (under the trade names Lutensol® A, Lutensol® AT, Lutensol® AO, Lutensol® TO, Lutensol® XP, Lutensol® XL, Lutensol® AP and Lutensol® ON of BASF AG). Preferably, polyoxyalkylene monoalcohols are used which contain ethylene oxide and/or propylene oxide and/or butylene oxide groups and are optionally modified with styrene oxide. Particularly preferred is the use of polyoxyalkylene monoalcohols (such as polyglycol B 11/50, polyglycol B 11/70, polyglycol B 11/100, polyglycol B 11/150, polyglycol B 11/300 or polyglycol B 11/700 of Clariant AG, Pluriol® A 1000 PE, Pluriol® A 1320 PE, or Pluriol® A 2000 PE of BASF SE or Terralox WA 110 of DOW Chemicals) which are butanol-initiated polyoxyalkylenes made of ethylene oxide and propylene oxide having a terminal OH group.

Hydrocarbon radicals, which may be present in Y:

The hydrocarbon radicals are preferably present as aryl radical, as branched or unbranched alkylaryl radical, aralkyl radical and/or as acyclic, cyclic branched or unbranched alkyl radical. Mixtures of such compounds, i.e., at least two different compounds Y—(OH)$_q$ can be used also. The aliphatic or araliphatic compounds Y—(OH)$_q$ can be present in straight-chain or branched, saturated or unsaturated form. Saturated species are preferred.

Examples of Y(—OH)$_q$ with hydrocarbon radicals—with q=1—are methanol, ethanol, butanol, ethyl hexanol, decanol, isotridecyl alcohol, lauryl alcohol, stearyl alcohol, Isobornyl alcohol, benzyl alcohol, propargyl alcohol, oleyl alcohol, linoleyl alcohol, oxoalcohols, neopentyl alcohol, cyclohexanol, fatty alcohols, alkyl phenols, alkyl naphthols, phenylethanol and sugar alcohols.

Examples of Y(OH)$_q$ with hydrocarbon radicals—with q>1—are butanediol, hexanediol, cyclohexane dimethanol, neopentyl glycol, ethylene glycol, glycerol and trimethylol propane.

Furthermore, Y(—OH)$_q$ can be polyolefin polyols or monools such as non-hydrogenated, partially hydrogenated and/or fully hydrogenated polybutadienes, unhydrogenated, partially hydrogenated and/or fully hydrogenated polyisoprenes, polyisobutylenes, polypropylenes, or ethylene/butylene copolymers. These compounds are known. For example, the access to hydroxy polyisobutylenes is described in U.S. Pat. No. 6,875,897.

Ester groups or polyesters, which can be included in Y:

Monohydroxy monoester and mono-, di-, or polyhydroxy polyesters can be used as Y—(OH)$_q$ also.

Hydroxy-functional acrylates or methacrylates, such as hydroxyethyl acrylate, hydroxyethyl methacrylate, hydroxybutyl methacrylate, are examples of suitable monohydroxy monoesters.

Polyester can be produced, for example, by reaction of dicarboxylic acids and their esterifiable derivatives, such as anhydrides, acid chlorides, or dialkyl esters (such as dimethyl esters or diethyl esters) thereof by reaction with diols, and mono-, di-, or tri-functional starting components. The formation of dihydroxy polyesters can be pushed back by the use of stoichiometric amounts of monohydroxy compounds, if necessary. The esterification can be carried out neat or by azeotropic esterification in the presence of an entraining agent. Examples of dicarboxylic acids are succinic acid, maleic acid, fumaric acid, glutaric acid, adipic acid, sebacic acid, pimelic acid, phthalic acid or dimerized fatty acids and their isomers and hydrogenation products. Examples of such dials are: ethylene glycol, 1,2-propanediol, 1,3-propanediol, 1,4-butanediol, 1,6-hexanediol, neopentyl glycol, cis-1,2-cyclohexane dimethanol, trans-1,2-cyclohexane dimethanol, and polyglycols based on ethylene glycol and/or propylene glycol.

Preferred polyesters for use as Y(—OH)$_q$ include those that can be obtained by polycondensation of one or more, optionally alkyl-substituted, hydroxy carboxylic acids and/or ring-opening polymerization of the corresponding lactones, such as propiolactone, valerolactone, butyrolactone, caprolactone, and/or substituted lactones by means of a mono-, di-, or or trihydroxy starting component (as described in U.S. Pat. No. 4,647,647 A). Preferably, they have a number average molecular weight M$_n$ of 150 to 5000 g/mol. Usable as the starting components are in principle all other compounds listed as Y—(OH)$_q$. It is also possible in each case to use mixtures of the aforementioned compounds. The lactone polymerization is carried out by known methods, initiated by, for example, titanates, p-toluenesulfonic acid or dibutyltin dilaurate, at temperatures of about 70° C. to 180° C. ε-caprolactone-based polyesters, optionally in combination with δ-valerolactone are particularly preferred.

Urethane radicals or polyurethanes, which may be present in Y:

Polyurethanes, polyether-polyurethanes, polyester-polyurethanes and/or polyether-polyester-polyurethanes can be used as Y—(OH)$_q$ also, and can be obtained by the addition reaction of diisocyanates with a dihydroxy compounds in the presence of mono-, di-, or tri-functional starting components. Preferably, the hydroxy compounds for synthesizing the urethane group-containing compounds Y—(OH)$_q$ are diols having 2 to 12 carbon atoms, polyoxyalkylene glycols and dihydroxy-functional polyesters. Said polyethers and polyesters are described above.

Polycarbonates, which may be present in Y:

The radical Y may also contain carbonate groups, such as those obtained by known reactions with open-chain and/or cyclic carbonates. Suitable examples are carbonate-modified linear polyesters or polycarbonate diols such as those used in the production of polyurethanes. Examples are described in U.S. Pat. No. 4,101,529. Suitable carbonates are, for example, aliphatic, cycloaliphatic, araliphatic and/or aromatic carbonic acid esters such as dialkyl carbonates, such as dimethyl carbonate, diethyl carbonate or diphenyl carbonate, catechol carbonates or cyclic alkylene carbonates. Especially suitable are cyclic alkylene carbonates having 5 or 6-membered rings which optionally may be substituted. Preferred substituents are aliphatic, cycloaliphatic and/or aromatic groups having up to 30 carbon atoms. Examples of suitable cyclic alkylene carbonates are ethylene carbonate, propylene carbonate, glycerol carbonate, trimethylene carbonate, 4-methyl trimethylene carbonate, 5-methyl trimethylene carbonate, 5,5-dimethyl trimethylene carbonate, 5,5-diethyl trimethylene carbonate or 5-methyl-5-propyl trimethylene carbonate.

Polyoxazolines, which may be present in Y:

Hydroxy-functional poly-2-alkyl-2-oxazolines or poly-2-alkyl-2-oxazines can act as Y—(OH)$_q$ also. Monohydroxy-functional compounds are used preferably. Poly-2-alkyl-2-oxazolines or poly-2-alkyl-2-oxazines are obtained by cationic ring-opening polymerization of 2-alkyl-2-oxazolines or 2-alkyl-2-oxazines with initiators, such as para-toluenesulfonic acid, methyl tosylate or methyl triflate. The oxazolinium or oxazinium end groups obtained as a result of the living cationic polymerization mechanism can be converted by alkaline hydrolysis via amino ester end groups into the more stable hydroxyamides. An alternative route for producing monohydroxy-functional poly-2-alkyl-2-oxazolines or poly-2-alkyl-2-oxazines is the polymerization using 2-(4-hydroxyphenyl)-N-methyl-2-oxazolinium trifluoromethanesulfonate as the initiating species. (A. Groβ, G. Maier, O. Nuyken, Macromol. Chem. Phys. 197, 2811-2826 (1996)). The compatibility can be controlled by the selection of the alkyl substituent, poly-2-ethyl-2-oxazoline, for example, is suitable for highly polar systems due its solubility in water, while poly-2-lauryl-2-oxazoline, for example, is compatible with non-polar systems. When block copolymers are made of 2-ethyl-2-oxazoline and 2-lauryl-2-oxazoline, the polymers are characterized by a particularly broad compatibility. Such poly-2-alkyl-2-oxazolines or poly-2-alkyl-2-oxazines generally have a number average molecular weight M$_n$ of 300 to 20,000 g/mol, preferably 500 to 10,000 g/mol. Various 2-oxazolines may be used, inter alia, which may have additional functional groups. Such species include, for example, corresponding fatty acid-based 2-oxazolines.

OH-functional polymers of ethylenically unsaturated compounds which may be present in Y:

OH-functional polymers of ethylenically unsaturated monomers may be used as Y(OH)$_q$ also.

The OH-functions can be introduced in a known method via the ethylenically unsaturated monomers, initiators or chain transfer agents. Monohydroxy-functional polyacrylates or polymethacrylates are preferred. Such compounds have been used in this area of the technology for producing other dispersants, such as those described in U.S. Pat. No. 4,032,698 A or in EP 318 999. These polyacrylates generally have a number average molecular weight $M_n$ of 300 to 20,000 g/mol, preferably generally 500 to 10,000 g/mol. They may be arranged in a block structure or randomly, or form a gradient.

Examples of OH-functional ethylenically unsaturated monomers are hydroxyalkyl methacrylates of straight-chain, branched or cycloaliphatic dials having 2 to 36 carbon atoms, such as 3-hydroxypropyl methacrylate, 3,4-dihydroxybutyl monomethacrylate, 2-hydroxyethyl methacrylate, 4-hydroxybutyl methacrylate, 2-hydroxypropyl methacrylate, 2,5-dimethyl-1,6-hexandiol monomethacrylate; caprolactone- and/or valerolactone-modified hydroxyalkyl methacrylates (wherein the hydroxy methacrylates are preferably derived from straight-chain, branched or cycloaliphatic dials having 2 to 8 carbon atoms); OH-functional poly(ethylene glycol) methacrylate, and OH-functional poly (propylene glycol) methacrylate.

Examples of other ethylenically unsaturated monomers are alkyl methacrylates of straight-chain, branched or cycloaliphatic alcohols having 1 to 22 carbon atoms, such as methyl methacrylate, ethyl methacrylate, n-butyl methacrylate, i-butyl methacrylate, t-butyl methacrylate, lauryl methacrylate, 2-ethylhexyl methacrylate, stearyl methacrylate, cyclohexyl methacrylate, isobornyl methacrylate and t-butyl methacrylate; aryl methacrylates such as benzyl methacrylate or phenyl acrylate (wherein the aryl radicals are unsubstituted or may have up to four substituents), such as 4-nitrophenyl methacrylate; mono methacrylates of ethers, polyethylene glycols, polypropylene glycols or mixed polyethylene/propylene glycols having 5 to 80 carbon atoms, such as tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether methacrylate, poly(propyleneglycol) methyl ether methacrylate; aminoalkyl methacrylates such as N,N-dimethylaminoethyl methacrylate, 2-trimethylammonium ethyl methacrylate chloride and N,N-dimethylaminopropyl methacrylate; methacrylates of halogenated alcohols, such as perfluoroalkyl methacrylates having from 6 to 20 carbon atoms; styrene and substituted styrenes, such as 4-methyl styrene, methacrylonitrile, and acrylonitrile; ethylenically unsaturated heterocycles such as, for example, 4-vinylpyridine and 1-[2-(methacryloyloxy)ethyl]-2-imidazolidinone; vinyl esters of carboxylic acids having 1 to 20 carbon atoms, such as vinyl acetate; maleimide, N-phenylmaleimide and N-substituted maleimides with straight-chain, branched or cycloaliphatic alkyl groups having 1 to 22 carbon atoms, such as N-ethyl maleimide, and N-octyl maleimide; methacrylamide; N-alkyl and N,N-dialkyl-substituted acrylamides with straight-chain, branched or cycloaliphatic alkyl groups having 1 to 22 carbon atoms, such as N-(t-butyl) acrylamide and N,N-dimethyl acrylamide;

Preferred non-OH-functional monomers are alkyl methacrylates, aryl methacrylates and styrene.

Polysiloxanes, which may be present in the Y:

Mono- or polyhydroxy-functional polysiloxanes may be used as $Y$—$(OH)_q$ also. The polysiloxanes can be described by the following general formula:

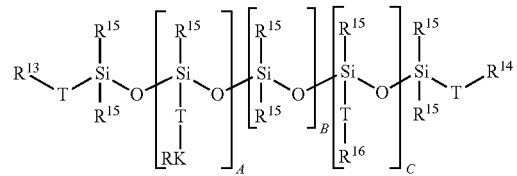

wherein
$T=C_1-C_{14}$ alkylene,
RK=unbranched polyether radical made of alkylene oxide units having 1-6 carbon atoms, and/or aliphatic and/or cycloaliphatic and/or aromatic polyester radical having a weight average molecular weight between 200 and 4,000 g/mol,
$R^{13}$ and $R^{14}$ are each independently represented by
$C_1-C_{14}$ alkyl, aryl or aralkyl, —O($C_1-C_{14}$ alkyl, aryl or aralkyl), —OC($C_1-C_{14}$ alkyl, aryl or aralkyl), —O—CO—O($C_1-C_{14}$ alkyl, aryl or aralkyl), $OSO_2$ ($C_1-C_{14}$ alkyl, aryl or aralkyl), —H, —Cl, —F, —OH, —R, —RK,
$R^{15}=C_1-C_{14}$ alkyl, aryl or aralkyl,
$R^{16}$=polyhydroxy-functional branched polyglycidol polyether radical consisting of a branched polyglycidol group or containing the same
A=0-20, preferably 1-15, particularly preferably 1-8,
B=2-300, preferably 10-200, particularly preferably 15-100, and
C=0-20, preferably 1-15, particularly preferably 1-8,
wherein $R^{14}=R^{16}$ and/or $R^{13}=R^{16}$ when C=0. When the unit —[$SiR^{15}(R^{16}-Z)$]—O— is present, i.e., C is at least 1, it is possible for $R^{13}$ and $R^{14}$ to be different from $R^{16}$.

Said polysiloxane radicals can also be present as organopolysiloxane radicals.

With respect to the diisocyanate $R^1(NCO)_2$ having NCO groups of different reactivity used according to the invention, is $R^1$ the same or different, and is often present in the form of a hydrocarbon radical, preferably as arylene group, as a branched or unbranched alkylarylene group and/or as an acyclic, cyclic, branched, or unbranched alkylene group. In principle (though usually a disadvantage), it is also possible to use the diisocyanates having NCO groups of different reactivity used according to the invention combined (mixed) with the other (di)isocyanates that do not have NCO groups with different reactivity. The use of large quantities, in particular, of these other (di)isocyanates, however, is usually a substantial disadvantage due to the lower selection effect with respect to the products formed.

In a preferred embodiment, the diisocyanate of the general formula (II) is present as toluene-2,4-diisocyanate and/or as isophorone diisocyanate, preferably as toluene-2,4-diisocyanate.

In the method according to the invention, the isocyanate addition can take place, depending on the reactivity of the individual reactants, in the temperature range typical for this type of reaction from room temperature to about 150° C., preferably to 100° C., particularly preferably up to 70° C. The known and typical catalysts such as tertiary amines, triethylamine, dimethylcyclohexylamine, N-methylmorpholine, N,N'-dimethylpiperazine, 2-(dimethylaminoethoxy) ethanol, diazabicyclo(2,2,2)octane and similar, and, in particular, organic metal compounds such as titanic acid esters, iron compounds such as iron(III)acetylacetonate, tin compounds, such as tin diacetate, tin dioctoate, tin dilaurate or the dialkyl derivatives of tin dialkyl salts of aliphatic carboxylic acids like such as dibutyltin diacetate, dibutyltin dilaurate or similar may be used for acceleration and reduction of side reactions. These catalysts are typically used in amounts from 0.0001 to 0.1 parts by weight per 100 parts by weight of diisocyanate.

Urethane (III) reacts with formation of the urea urethane (or diurethanes) under the same reaction conditions as the addition of the alcohol component $Y(\text{—OH})_q$ to the diisocyanate. However, as a primary or secondary amine reacts significantly faster with the isocyanate group of the urethane (III) than a hydroxy function, the addition reaction can be carried accordingly without catalysts in the reaction of primary or secondary amines.

The method according to the invention can, depending on the viscosity, be carried out neat or in the presence of suitable solvents, solvent mixtures, or other suitable carrier media. Suitable solvents or carrier media are those which are not reactive under the reaction conditions selected, or the reactivity of which is negligible with respect to the reactants and in which the reactants and the reaction products are at least partially soluble. These include, for example, hydrocarbons such as toluene, xylene, aliphatic and/or cycloaliphatic petroleum fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of mono-, di- or polycarboxylic acids such as ethyl acetate, butyl acetate, butyrolactone, dimethyl-2-methylglutarate, triacetin, phthalates or other plasticizers, di- or polycarboxylic acid esters, dialkyl esters of $C_2$-$C_4$ dicarboxylic acids called "dibasic esters", alkyl glycolester such as ethyl glycol acetate, methoxy propyl acetate, ketones such as methyl isobutyl ketone, cyclohexanone, acetone, acid amides such as dimethylformamide, N-methylpyrrolidone and the like. Suitably, the solvent(s) or carrier media are selected already taking into account the planned field of use. For example, for use in water-dilutable paint systems or for coating pigments in aqueous suspension after pigment synthesis preferably solvents are used that are completely or partially water-dilutable. If the product of the method is intended for use, for example, where the presence of volatile organic compounds (VOC) is not desired, the formulation should preferably be present free of solvents or accordingly in carrier materials that are considered to be VOC-free.

Depending on the field of application, the solvents used for synthesis may remain in the reaction mixture or will be wholly or partially removed and optionally replaced with other solvents or carrier media. The solvent may be wholly or partially removed, for example, by distillation, optionally at reduced pressure and/or azeotropically with the addition of water. The active substance (compound of general formula IV) can be isolated by precipitation by addition of non-solvents such as aliphatic hydrocarbons, such as hexane, followed by separation by filtration, and optionally drying. The active substance obtained by one of these methods can then be dissolved in a solvent suitable for the particular field of application or may be used in pure form, for example, in powder coatings or be absorbed on inert carriers. For applications in which the use of solids is preferred, such as powder coatings, or certain plastics processing methods, the compounds may also be converted into a solid form by other known methods. Examples of such methods are microencapsulation, spray drying, adsorption onto a solid carrier such as $SiO_2$, or the PGSS method (Particle from Gas Saturated Solutions).

The compounds used in the sequence of steps iii-b) of the method according to the invention, which contain at least one isocyanate-reactive group HX, and at least one other functional group Q (especially preferably present as OH), generally have the following general structures:

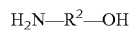

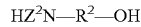

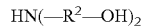

wherein $Z^2$ and $R^2$ are each as described above, but preferably are identical to or different from $R^2$ and are represented by a branched or unbranched alkylene group having 2 to 12 carbon atoms.

Specific examples of such OH-functional amines are ethanolamine, propanolamine, iso-propanolamine, 5-aminopentanol, 2-(2-aminoethoxy) ethanol, N-methyl ethanolamine, N-ethyl ethanolamine, N-butyl ethanolamine, diethanolamine, 3-((2-hydroxyethyl)-amino)-1-propanol, diisopropanolamine and N-(2-hydroxyethyl) aniline.

Corresponding hydroxyl groups-containing urethane ureas (or diurethanes) can be reacted subsequently with an ester-forming phosphorus compound under formation of phosphoric acid esters (according to sequence of steps iii-b—subsequent phosphorylation). Typically, there is a reaction of at least one hydroxyl group of the urea urethane with an ester-forming phosphorus compound (as phosphorylization agent). An ester-forming phosphorus compound is understood to be a compound capable of forming phosphoric acid esters by reaction with a hydroxyl group-containing compound. For example, polyphosphoric acid, phosphorus pentoxide, phosphorus oxychloride and acetyl phosphate can be used as ester-forming phosphorus compounds. Polyphosphoric acid or phosphorus pentoxide are used preferably, particularly preferably polyphosphoric acid. Using polyphosphoric acid mainly monoesters are formed, and using phosphorus pentoxide mainly mono/diester mixtures are formed. The monoesters are preferred. It is also possible that a mixture of different components to be phosphorylated is used in the phosphorylation reaction.

The reaction of the ester-forming phosphorus compounds with the hydroxyl compounds is preferably carried out without a solvent at temperatures up to 150° C., preferably below 100° C. The reaction can also be carried out in the presence of suitable inert solvents (for example, methoxypropyl acetate).

Owing to the acidic groups, the phosphorus acid esters are capable of forming salts. These may be used as a dispersant in the form of the corresponding salts. In some cases, such a partial or complete salification results in an improved efficiency and/or improved solubility or compatibility. Also, in applications where the acidity of the products gets in the way, improvements are often achieved by partial or complete neutralization. Suitable salt-forming compounds are alkali and alkaline earth salts such as carbonates, bicarbonates or hydroxides, low molecular weight amines such as triethanolamine, diethyl ethanolamine, dibutyl ethanolamine and oleylamine. Further, it is possible to have salts of the phosphoric ester compounds according to the invention with polymeric amines analogously to EP-A-0 893 155 as wetting agent and dispersant.

Thus, in a preferred embodiment according to the invention, the head group of the head group radical $Z^1$ is present in the form of a phosphoric acid ester function, wherein step iii) is carried out in the form of a sequence of steps iii-b) and the other functional group Q is present in the form of a hydroxyl group and the other reagent involved in the generation of head group radical $Z^1$ is preferably present as phosphorylization agent.

In a typical embodiment according to the invention, the head group radical $Z^1$ therefore has a phosphoric acid ester group as a head group, wherein $Z^1$ is the same or different and is represented by the general formula (VII)

$$R^2—O—PO(OR^3)_n(OH)_{2-n} \qquad (VII)$$

wherein
$R^2$ is the same or different and is represented by a saturated or unsaturated, branched or unbranched organic radical having at least two carbon atoms,
$R^3$ is the same or different and is represented by a saturated or unsaturated, branched or unbranched organic radical, and
n is the same or different and is represented by 0 and/or 1.

Typically, n is 0 and $R^2$ is preferably the same or different and is represented by a saturated, linear $C_2$-$C_{40}$ alkylene radical.

However, n can be equal to 1, and $R^3$ then, for example, can be represented by —X—CO—NH—$R^1$—NH—CO—O—Y. Such substitution patterns can form especially when specific phosphorylization agents are used, such as phosphoryl chloride.

In a further preferred embodiment according to the invention, the head group of the head group radical $Z^1$ is the same or different and is present as a tertiary amino function or quaternary ammonium function.

In step iii-a) of the method according to the invention, then, typically compounds of general formula (IV) are formed, which carry at least one tertiary amino function. These tertiary amines can be reacted with acids such as carboxylic acids or phosphoric acids and esters thereof to form the corresponding ammonium salts.

Such basic compounds of formula IV with tertiary amino groups may also be combined with compounds of the formula IV with acidic head groups $Z^1$, and with partial or complete salt formation.

Furthermore, the tertiary amines can be converted into the corresponding quaternary ammonium salts in alkylation reactions with alkyl halides such as benzyl chloride, methyl iodide, or by oxiranes such as alkylene oxides and glycidyl ethers in the presence of acids such as carboxylic acids or phosphoric acids and esters thereof.

The tertiary amines can be converted into amine oxides with oxygen, peroxy compounds, such as percarboxylic acids and hydrogen peroxide, which then can also be salified with acids such as hydrochloric acid.

OH-functional amines (X═OH) can be used, which have the following structure:

$$HO—R^{12}—NR^{11}_2$$

wherein $R^{12}$ is the same or different and is represents like $R^2$.

$R^{11}$ as an organic radical is the same or different and may be represented by an alkyl radical, aryl radical and/or aralkyl radical and optionally may contain ester, ether and tert. amino groups.

Furthermore, the radical —$NR^{11}_2$ may be a saturated, unsaturated or aromatic cyclic or heterocyclic ring. 5- and 6-rings are preferred.

Specific examples of such OH-functional tertiary amines are 2-dimethylamino ethanol, 2-diethylamino ethanol, 3-dimethylamino propanol, 3-diethylamino propanol, dimethyl-aminoethoxy ethanol, N,N,N'-trimethylaminoethyl ethanolamine, N,N-dimethyl isopropanolamine, N-ethyl-N-(2-hydroxyethyl) aniline, N,N,N'-trimethyl-N'-hydroxyethyl-bisamino ethylether and N,N-bis-(3-dimethylaminopropyl)-N-isopropanolamine.

Alternatively (and optionally additionally), oligoamines with X═NH or $NZ^2$ having the following general structure can be used:

$$H_2N—R^{13}—NR^{11}_2$$

$$HZ^2N—R^{13}—NR^{11}_2$$

$$HN(—R^{13}—NR^{11}_2)_2$$

wherein $R^{11}$ is as described above, and $R^{13}$ is the same or different and is represented like $R^2$.

Examples of appropriate oligoamines are 2-(diethylamino)ethylamine, 3-(dimethylamino)propylamine, 3-(diethylamino)propylamine, bis-(3-dimethylaminopropyl) amine and N-(3-aminopropyl)imidazole.

Furthermore, diols (X═OH) having the following general structure can be used:

$$HO—R^{14}—OH$$

wherein $R^{14}$ is the same or different and is represented like $R^2$.

In this context alkanediols are preferred.

Normally, $Z^2$ is the same or different and is represented by a $C_1$-$C_{50}$ hydrocarbon radical optionally having ether oxygen atoms. Alternatively, $Z^2$ can be the same or different and have the equivalent of $Z^1$, with the proviso that $Z^1$ and $Z^2$ each are represented independently of one another (thus, $Z^1$ and $Z^2$ may be the same or different within a molecule and in comparison with different molecular species.

In a particularly preferred embodiment according to the invention, X is the same or different and is represented by NH and/or $NZ^2$.

Preferably, $Z^1$ and $Z^2$ are each independently represented by radicals that in each case are either relatively weakly reactive or, preferably, inert with respect to isocyanates. Typically, this prevents the formation of unwanted by-products or competing reactions in the method according to the invention.

In a preferred embodiment, in step i) the diisocyanate of the general formula (II) is used with respect to the hydroxy component of the general formula (I) in a molar ratio of at least (1.5*arithmetic mean of q):1.0, preferably at least (2.0*arithmetic mean of q):1.0. Thus, the selectivity with respect to the generation of the compound of general formula (IV) is improved (lower proportion of by-products).

In general, in step ii) at least 75 mol %, preferably at least 90 mol % of the unreacted portion of the diisocyanate of the general formula (II) is removed from the reaction mixture. The diisocyanate deteriorates the quality of the product of the method and is considered to be harmful to the environment.

Usually, the molar ratio of the monohydroxy compounds of the general formula (Ia) reacted in total in step i) to the sum of the compounds of general formula (V) reacted in step iii) and the compounds reacted in step iii) containing a isocyanate-reactive group HX and at least one further functional group Q, is 0.9 to 1.1, preferably 0.95 to 1.05. Thus, the selectivity with respect to the generation of the compound of general formula (IV) is improved (lower proportion of by-products).

Mostly, in step iii) as much compounds of the general formula (Va) and/or as much compounds having one isocyanate-reactive group HX and at least one further functional group Q, is used, that at least 90 mol %, particularly preferably at least 99 mol % of the monoisocyanate adduct of the general formula (IIIa) formed in step i) is reacted.

Then, usually, in step i) the diisocyanate of the general formula (II) with respect to the monohydroxy compound of the general formula (Ia) is used in a molar ratio of at least 1.5:1.0, preferably from 2.5:1 to 20:1.

The invention further relates to an additive composition which can be produced in accordance with the method described above.

A particularly typical additive composition according to the invention, which can be produced according to the invention with the use of monohydroxy compounds (q=1), includes:

i) 10 to 99.98% by weight of the compound according to the general formula (IVa) Y—O—CO—NH—$R^1$—NH—CO—X—$Z^1$, ii) 0.01 to 10% by weight diurethane according to the general formula Y—O—CO—NH—$R^1$—NH—CO—O—Y, wherein Y is the same or different, iii) 0.01 to 10% by weight diurea of the general formula $Z^1$—X—CO—NH—$R^1$—NH—CO—X—$Z^1$, wherein $Z^1$ is the same or different; and iv) 0 to 8% by weight urethane of the general formula Y—O—CO—NH—$R^1$—NCO.

The species of the general formula (IV) or (IVa) may be present in non-salified, partially salified and/or salified form. The presence in non-salified, salified and/or partially salified form is usually depending on the one hand on the chemical environment (pH value) and on the other hand on the type of compound species as such.

The additive compositions produced by the method according to the invention—not post-treated or purified— typically contain small amounts diurethane and diurea. Corresponding small amounts of the diurethane or the diurea do not cause any deterioration in the use as wetting agent and dispersant and are a clear indication that the additive composition has been produced using monohydroxy compounds (q=1) by the method according to the invention. By using appropriate amounts of the amine in the second step of the method according to the invention, the proportion of the urethane of the general formula Y—O—CO—NH—$R^1$—NCO can usually be reduced at least to almost zero, which is usually advantageous for the quality of the additive compositions according to the invention. The additive composition according to the invention is environmentally friendly, easy to store and shows—corresponding as the phosphoric acid derivatives according to the invention as such—excellent properties as a wetting agent and dispersant.

Other components of the additive composition according to the invention may be solvents or lithium salts, for example.

The present invention further relates to the use of the additive composition described above as an additive, preferably as a wetting agent and dispersant in coatings, especially paints, plastics, pigment pastes, sealants, cosmetics, ceramics, adhesives, casting compounds, fillers, printing colors and inks.

In addition, the invention relates to a solid mixture containing particles and/or fibers that have been treated with an additive composition described above.

Finally, the invention relates to a paint and/or plastics, which contains the additive composition according to the invention.

The additive composition according to the invention is used for example as aluminum passivator, dispersant, dispersion stabilizer or wetting agent and can be used, for example, in pigmented and/or filler-containing products, such as pigment concentrates or pastes, coating compositions, sealants, plastics, ceramics, cosmetics, adhesives, casting compounds, fillers, printing colors and/or inks. Preferred pigment concentrates are those which can be mixed with appropriate paint systems, thereby producing pigmented paints.

Additive compositions according to the invention can be used, for example, in producing or processing of paints, printing colors, inks, for example for inkjet printing, paper coatings, leather and textile inks, pastes, pigment concentrates, ceramics, adhesives and sealants, casting materials, plastics and cosmetic preparations, in particular, if they contain solids such as pigments and/or fillers (also fibrous).

They can be used also in the manufacture or processing of molding compositions based on synthetic, semisynthetic or natural macromolecular substances, such as polyvinyl chloride, saturated or unsaturated polyesters, polyurethanes, polystyrenes, polyacrylates, polyamides, epoxy resins, polyolefins such as polyethylene or polypropylene. They can be used, for example, for the production of casting materials, potting materials, PVC plastisols, gelcoats, polymer concrete, circuit boards, industrial paints, wood and furniture paints, automotive paints, marine paints, anticorrosive paints, can and coil coatings, or painter and architectural paints.

The additive compositions according to the invention can be used not only in paint systems for pigmented paints. It is also possible to use them in a wide range of formulations and products, such as resins, oils, greases, lubricants, rubbers, sealants, printing colors, inks, adhesives, waxes or coating compositions. The concentrates can also be used in formulations that are produced in the personal care industry or in electrical applications in the electronics industry, shipbuilding industry, in the context of medical applications, in the construction industry or in the automotive industry. Examples include electronic paper, such as the display of e-books, the encapsulation of microelectronic chips and circuit boards, underwater hull coatings, such as anti-fouling coatings, silicone tubes or slip additives for brake components.

Advantageously, the additive compositions according to the invention can be used also in the manufacture of color filters for liquid crystal displays, liquid crystal screens, color resolution devices, sensors, plasma screens, displays based on SED (Surface conduction Electron emitter Display) and for MLCC (Multilayer Ceramic Compounds). MLCC technology is applied in the production of microchips and printed circuit boards.

The use in cosmetic preparations may serve, for example, the manufacture of cosmetic preparations such as make-up, powder, lipstick, hair dye, creams, nail polish and sunscreen preparations. These may be present in the usual forms, such as W/O or O/W emulsions, solutions, gels, creams, lotions or sprays. Advantageously, the additive compositions according to the invention can be used in dispersions used for producing these compositions. They may contain the carrier media typically used for these purposes in cosmetics, such as water, castor oils or silicone oils and solids, such as organic and inorganic pigments such as titanium dioxide or iron oxide.

Other fields of application worth mentioning include NIP (non-impact printing), inkjet (on paper, foil, ceramic, artificial and natural fiber fabrics), dispersing ceramic (aqueous or anhydrous), dispersing in potting materials. The additive compositions according to the invention can also be used as such, i.e., without having been previously incorporated into a corresponding concentrate, in the formulations and fields of applications mentioned above.

Typically, the product containing phosphoric acid ester derivatives, as well as pigment and/or fillers, is a paint, or a pigment concentrate for coating compositions. Ultimately, however, the use of said phosphoric acid ester derivatives is possible in any pigment-containing and/or filler-containing products.

In particular, the pigment concentrates are compositions which contain, besides the additive composition according to the invention, for example, organic solvents and at least one pigment. They contain, in particular, no or only small proportions of organic polymers as a binder. Advantageously, such known binders are present in the corresponding paint systems and are described below.

Suitable organic solvents are in particular those typically used in the field of paint and dye industry and which are known to those skilled in the art such as aliphatic solvents, cycloaliphatic solvents, aromatic solvents, such as toluene, xylene, solvent naphtha, ethers, esters and/or ketones, for example, butyl glycol, butyl diglycol, butyl acetate, methyl isobutyl ketone, methyl ethyl ketone and/or solvents such as methoxypropyl acetate, diacetone alcohol.

Suitable pigments are the pigments known to the person skilled in the art. Examples of pigments are mono-, di-, tri- and polyazo pigments, oxazine, dioxazine, thiazine pigments, diketo pyrrolo pyrroles, phthalocyanines, ultramarine, and other metal complex pigments, indigoid pigments, diphenylmethane pigments, triarylmethane pigments, xanthene pigments, acridine pigments, quinacridone pigments, methine pigments, anthraquinone, pyranthrone, perylene pigments, and other polycyclic carbonyl pigments, inorganic pigments such as carbon black pigments and/or pigments based on carbon black, graphite, zinc, titanium dioxide, zinc oxide, zinc sulfide, zinc phosphate, barium sulfate, lithophone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow and chromium titanium yellow), magnetic pigments based on pure iron, iron oxides and chromium oxides or mixed oxides, metallic effect pigments of aluminum, zinc, copper or brass and pearlescent pigments or fluorescent and phosphorescent pigments. Other examples are nanoscale organic or inorganic solids with particle sizes below 100 nm in at least one dimension, such as certain types of carbon black or other allotropic forms of carbon, such as single-wall CNTs, multi-wall CNTs and graphene. The determination of the particle size is performed, for example, by transmission electron microscopy, analytical ultracentrifugation or light scattering methods. Worth mentioning are also particles that consist of a metal or semimetal oxide or hydroxide, as well as particles consisting of mixed metal and/or semimetal oxides or hydroxides. For example, the oxides and/or oxyhydroxides of aluminum, silicon, zinc, titanium, etc. can be used to produce such extremely finely divided solids. The production process of these oxide or hydroxide or oxide-hydroxide particles can involve a the wide variety of methods such as, for example, ion exchange processes, plasma processes, sol-gel methods, precipitation, comminution (e.g. by grinding) or flame hydrolysis. All of the above pigments may be present in a surface-modified form and have basic, acidic or neutral groups on the surface.

Where the respective products, especially the coating compositions, contain fillers, the fillers are, for example, fillers known to the person skilled in the art. Examples of powdery or fibrous fillers are, for example, those which are composed of powdery or fibrous particles of alumina, aluminum hydroxide, silica, diatomaceous earth, siliceous earth, quartz, silica gel, talc, kaolin, mica, perlite, feldspar, slate flour, calcium sulfate, barium sulfate, calcium carbonate, calcite, dolomite, glass or carbon. The fibers used may be organic and/or inorganic in nature and are also used as reinforcement materials. Other examples of pigments or fillers may be found, for example, in the U.S. Pat. No. 4,795,796 A. Provided that the compounds according to the invention are not already used in the usual amounts of additives for this purpose, flame retardants also, such as aluminum or magnesium hydroxide and matting agents such as silicas can also be dispersed and stabilized particularly well by the wetting agents and dispersants according to the invention.

The additive compositions according to the invention are also particularly suitable for the production of solid concentrates, such as pigment concentrates. For this purpose the phosphoric acid ester derivatives according to the invention are presented in a carrier medium such as organic solvents, plasticizers and/or water, and the solids to be dispersed are added with stirring. In addition, these concentrates may contain binders and/or other excipients. Using the additive compositions according to the invention, it is possible, in particular, to produce stable binder-free pigment concentrates. Using the additive compositions according to the invention it is also possible to produce flowable solid concentrates from pigment press cake. For this purpose, the compound according to the invention is mixed with the press cake, which can still contain organic solvents, plasticizers and/or water, and the mixture thus obtained is dispersed. The solid concentrates produced by different routes can then be incorporated in different substrates such as alkyd resins, polyester resins, acrylate resins, polyurethane resins or epoxy resins. Pigments can also be dispersed without solvent directly in the additive compositions according to the invention and are particularly suitable for pigmenting thermoplastic and thermosetting plastics formulations.

Depending on the field of application, the additive compositions according to the invention are used in amounts such that the product ultimately interesting for further application contains a proportion of the wetting agent and dispersant according to the invention advantageously from 0.01 to 10% by weight, based on the total amount of the respective product. Higher proportions are also possible.

Based on the solid to be dispersed, for example, the pigment, the additive composition according to the invention is used in an amount of preferably 0.5-100% by weight. When using solids that are difficult to disperse, the amount of wetting agent and dispersant according to the invention may well be higher. Generally, the amount of dispersant is dependent on the surface to be coated of the substance to be dispersed. Therefore, it can be important, for example, which pigment it is. Generally, it can be said that the dispersion of inorganic pigments generally requires less dispersant than is required for dispersing organic pigments, as the latter tend to have a higher specific surface and therefore require a larger amount of dispersant. Typical dosages of the wetting agent and dispersant for inorganic pigments are, for example, 1 to 20% by weight, for organic pigments 10 to 50% by weight, each based on the solid to be dispersed, particularly the pigment. In case of very finely divided pigments (for example, some carbon blacks) added amounts of 30 to 90% or more are needed. The criteria for sufficient pigment stabilization can include, for example, gloss and transparency of the coating compositions, or the degree of floating. The dispersion of the solids can take place as grinding a single solid or as grinding a mixture of multiple pigments simultaneously, with the best results being achieved normally in grinding a single solid. Using mixtures of different solids may increasingly result in agglomerations in the liquid phase due to opposing charges on the surface of the solid. In these cases, the use of the phosphoric acid ester derivatives according to the invention can frequently achieve a uniform, usually positive, charge of all the particles, thus avoiding instabilities due to charge differences. The dispersants achieve their optimum effect when added to the ground material, especially when first the solid to be dispersed is only mixed with the additive and optionally solvents ("premix"), since then, the additive can preferentially adsorb to the solid surface, without having to compete with the binder polymers. In practice, however, this procedure is only necessary in exceptional cases. If necessary, the additive compositions according to the invention may also be used later (as so-called "post-additives") to solve floating or flocculation issues in an already finalized batch, for example. In this case, however, usually higher additive doses are required.

The products, in particular, the coating compositions or paints, in which the additive compositions according to the invention are to ultimately exert their effects, can also contain an organic polymer as a binder. Such binders are known to the person skilled in the art. Said at least one binder may be introduced, for example, by means of a paint system, which is mixed, for example, with a pigment concentrate containing the phosphoric acid ester derivatives according to the invention, so that the product under consideration is a pigmented paint. Other pigmented and/or filler-containing products, such as plastics, sealants, and other products known to the person skilled in the art based on an organic polymer matrix are possible also. As product is considered a system which comprises a polymeric resin or an organic polymer as the binder, and thereby is capable of forming a solid organic polymer matrix (for example, a coating composition) under appropriate curing conditions. Also referred to as product is a system that by simple mixing with a component which contains a binder can form such organic polymeric matrix (for example, a pigment concentrate). Used are, for example, but not limited to, alkyd resins, polyester resins, acrylate resins, polyurethane resins, cellulose nitrates, cellulose acetobutyrates, melamine, chlorine rubbers and/or epoxy resins known to the person skilled in the art. Examples of water-based coatings are cathodic or anodic electrodeposition paints, e.g., for automobile bodies. Other examples include plasters, silicate paints, emulsion paints, water-based paints based on water-dilutable alkyds, alkyd emulsions, hybrid systems, 2-component systems, polyurethane and acrylate dispersions. Both 1-component systems and 2-component systems are possible, wherein in the latter case, in general, also polyisocyanates, melamine resins and/or polyamide resins are present in the second component as the typical crosslinking agents known to the person skilled in the art. Preferred product systems, in particular coating compositions contain an acrylate resin as binder. In a further variant, it is a 2-component (2K) coating composition or a 2K paint containing an epoxy resin in the binder component and a polyamide resin in the crosslinking component.

The coating compositions that are preferred as the products may be water-based or solvent-based. Water-based is to be understood that the coating composition contains mainly water as a solvent. Specifically, in a water-based coating composition not more than 10% by weight of organic solvent, based on the total amount of solvents, is contained in the coating composition. A coating composition is considered solvent-based when it does not comprise more than 5% by weight, preferably not more than 2% by weight of water, based on the total amount of solvents.

Other suitable product components include, for example, photoinitiators, defoamers, wetting agents, film-forming additives, such as cellulose derivatives (for example, cellulose nitrates, cellulose acetates, cellulose acetobutyrate), reactive diluents, flow control agents, dispersants, and/or rheology control additives.

Pigment concentrates and coating composition which are preferred as products are produced by methods known to the person skilled in the art. The known methods are used, such as the stepwise addition with stirring and mixing of the components of the coating composition in conventional mixing equipment such as stirred tanks or dissolvers.

Coatings or paint layers can be produced using the preferred pigment concentrates and coating compositions. The preparation of the coating takes place via the application techniques known to the person skilled in the art onto a substrate and subsequent curing.

The application is carried out, for example, by the known spray, spraying, brushing, rolling, casting, impregnating and/or dipping methods. After application of the coating composition onto a substrate, the curing or drying is carried out by conventional methods. For example, the applied coating composition may be curable by physically drying, thermally and/or by applying actinic radiation (radiation-curing), preferably UV radiation, and electron beams, for example. Thermal curing can take place for example in the range of about 10° C. to about 400° C., depending on the type of coating composition and/or the substrate. In each individual case, the duration of the curing depends, for example, on the type of curing method (thermally or actinically), the type of coating composition used and/or the substrates. For this purpose, the substrate may be moved or it may rest.

In addition to the application above described as dispersants and/or coating agents for powdery and fibrous solids, additive compositions according to the invention can also be used as viscosity reducers and compatibilizers in synthetic resins. Examples of such synthetic resins include the so-called "sheet molding compounds" (SMC) and "bulk molding compounds" (BMC), which consist of unsaturated polyester resins having a high filler and fiber content. Their production and processing is exemplified in U.S. Pat. No. 4,777,195 A. An issue in SMC and BMC resin mixtures is often the addition of polystyrene (PS) to the formulation in order to reduce the shrinkage during processing. PS is not compatible with the unsaturated polyester resins used and thus resulting in the separation of the components. When using PS-filled SMC or BMC mixtures, the phosphoric acid ester derivatives according to the invention can, due to their good dispersing qualities, bring about compatibilization between PS and unsaturated polyester resin, which increases the storage stability and process reliability of such mixtures.

Phase transfer effects can be achieved by means of the additive compositions according to the invention, for example, in incompatible polyol mixtures, polyol-isocyanate mixtures or polyol-propellant mixtures (such as are used in the production of polyurethane).

Hereinafter, the present invention is further illustrated by the following examples.

EXAMPLES

In substances that are not uniform at the molecular level, the molecular weights indicated represent number average values. In the presence of titratable hydroxyl or amino groups, the molecular weights or number average molecular weights $M_n$ are determined by end-group determination via determining the OH value or amine value. In case of compounds that are not amenable to end-group determination, the number average molecular weight is determined by gel permeation chromatography against a polystyrene standard.

Unless stated otherwise, data provided in parts means parts by weight and data provided as a percentage means percent by weight.

The free NCO content of the polyisocyanates used and the course of the reaction of the NCO additions is determined according to EN ISO 9369 by reaction with butylamine and subsequent titration of the excess amine. These methods are also described in Saul Patai, "The Chemistry of Cyanates and Their Thioderivates", Part 1, Chapter 5, 1977.

Production of Polyether-Polyester Y1, Mn 780

350 g of MPEG 350 (methoxy polyethylene glycol, Mn 350), 434 g of -caprolactone and 1 g of DBTL (dibutyltin dilaurate) are reacted at 160° C. until a solid of >95% is achieved.

The OH value of the reaction product is 72 mg KOH/g

Preparation of a Siloxane-Containing Epsilon-Caprolactone Polyester Y2, Mn 2800

35 g of an alpha, omega-hydroxyalkyl-functional dimethylpolysiloxane having a total molecular weight of about 900 g/mol are reacted with 75 g of epsilon-caprolactone. For this purpose, the mixture is allowed to react upon addition of 0.035 g of DBTL in an N2 atmosphere for about 8 hours at 160° C. The reaction is complete when the content of non-volatile components is larger than 98%. The alpha, omega-hydroxyalkyl-functional dimethylpolysiloxane used as the starting alcohol is obtained in the conventional manner known to the person skilled in the art, by the addition of suitable unsaturated alcohols (such as the allyl alcohol used in this example) to dimethyl polysiloxanes which carry terminal silane moieties.

Other hydroxy-functional polyesters used as Y—OH are produced in an analogous manner.

General Preparation of Monoadducts:

A four-necked flask equipped with a stirrer, thermometer, dropping funnel, reflux condenser and nitrogen inlet tube is charged with 430 g of Desmodur T 100 (about 100% 2,4-toluene diisocyanate, NCO content=48.8) and 7 g benzoyl chloride and mixed thoroughly. X g of the alcohol component, which is water-free and in case of polyethers alkali-free, are added slowly so that the temperature does not exceed 55° C. After dosing, the mixture is stirred for a further 3 hours at 55° C. Excess TDI is removed from the reaction mixture by thin-film evaporator at 150° C. The residual TDI content is <1%.

| Mono-adduct | Alcohol component | Amount X in [g] |
|---|---|---|
| M1 | Butanol-initiated PO-polyether Mn 800, OH value: 70 mg KOH/g | 800 |
| M2 | MPEG 350, OH value: 162 mg KOH/g | 350 |
| M3 | Butanol-initiated EO/PO-polyether (EO:PO 1:1) Mn 2240, OH value: 25 mg KOH/g | 2240 |
| M4 | Polyester Y1, OH value: 72 mg KOH/g | 780 |
| M5 | Hexadecanol-initiated monohydroxy-functional ε-caprolactone polyester, Mn 600 | 600 |
| M6 | Hexadecanol-initiated monohydroxy-functional ε-caprolactone polyester, Mn 1200 | 1200 |
| M7 | MPEG 500 = methoxypolyethylene glycol, Mn 500 | 500 |
| M8 | Butanol-initiated EO/PO-polyether (EO:PO 1:1) Mn 1100 | 1100 |
| M9 | B11/50 = butanol-initiated EO/PO-polyether (EO:PO 1:1) Mn 1700 | 1700 |
| M10 | Butanol-initiated EO/PO-polyether (EO:PO 1:1) Mn 2000 | 2000 |
| M11 | Butanol-initiated EO/PO-polyether (EO:PO 1:1) Mn 3100 | 3100 |
| M12 | Butanol-initiated EO/PO-polyether (EO:PO 1:1) Mn 4800 | 4800 |
| M13 | Hydroxyethyl acrylate-initiated ε-caprolactone polyester, Mn 1200 | 1200 |
| M14 | Monohydroxy-functional hydroxypropyl polydimethylsiloxane with butyl end group, Mn 1200 | 1200 |
| M15 | Methanol-initiated EO/PO-polyether (EO:PO 3:1), Mn 1400 | 1400 |
| M16 | MPEG 500-initiated ε-caprolactone polyester Mn 900 | 900 |
| M17 | iso-Decanol-initiated ε-caprolactone polyester Mn 700 | 700 |
| M18 | iso-Decanol-initiated ε-caprolactone polyester Mn 1000 | 1000 |
| M19 | Monophenylglycol-initiated ε-caprolactone polyester Mn = 1200 | 1200 |
| M20 | n-Butanol-initiated ε-caprolactone polyester, Mn = 600 | 600 |
| M21 | n-Butanol-initiated ε-caprolactone polyester, Mn = 1200 | 1200 |
| M22 | Butanol-initiated PO-polyether, Mn 1100 | 1100 |
| M23 | iso-Decanol-initiated polyester made of ε-caprolactone and δ-valerolactone in the molar ratio 3:1, Mn = 2000 | 2000 |
| M24 | B11/50-initiated ε-caprolactone polyester, mean molecular weight Mn = 2000 | 2000 |
| M25 | MPEG 350-initiated ε-caprolactone polyester Mn 900 | 900 |
| M26 | MPEG 350-initiated polyester made of ε-caprolactone and δ-valerolactone in the molar ratio 3:1, Mn = 950 | 950 |
| M27 | MPEG 500-initiated polyester made of ε-caprolactone and δ-valerolactone in the molar ratio 3:1, Mn = 1100 | 1100 |

| Mono-adduct | Alcohol component | Amount X in [g] |
|---|---|---|
| M28 | MPEG 750-initiated polyester made of ε-caprolactone and δ-valerolactone in the molar ratio 3:1, Mn = 1400 | 1400 |
| M29 | MPEG 750 | 750 |
| M30 | ε-Caprolactone polyester Mn 1600, started with a methanol-initiated EO/PO-polyether (EO:PO 3:1), Mn 1400 | 1600 |
| M31 | Butanol-initiated EO/PO-polyether (EO:PO 1:1) Mn 3170 | 3170 |
| M32 | Butanol-initiated EO/PO-polyether (EO:PO 1:1) Mn 2540 | 2540 |
| M33 | Butanol-initiated PO-polyether, Mn 2240 | 2240 |
| M34 | Butanol-initiated butylenoxide-polyether, Mn 960 | 960 |
| M35 | Alpha, omega-dihydroxy-functional hydroxypropyl polydimethylsiloxane, Mn 1800 | 1800 |
| M36 | Y2, dihydroxy-functional ε-caprolactone polyester Mn 2800, started with an alpha, omega-dihydroxy-functional hydroxypropyl polydimethylsiloxane, Mn 900 | 2800 |
| M37 | Oleyl alcohol | 268 |
| M38 | Monophenyl glycol | 138 |
| M39 | Isotridecyl alcohol | 200 |
| M40 | n-Decanol | 158 |
| M41 | Isodecanol | 158 |
| M42 | Benzylalkohol | 108 |
| M43 | Cyclohexanol | 100 |
| M44 | Isobutanol | 74 |
| M45 | Polyethylene glycol (dihydroxy-functional), Mn 600 | 300 |
| M46 | Polyethylene glycol (dihydroxy-functionell), Mn 1000 | 500 |
| M47 | Dipropylene glycol monomethyl ether | 148 |
| M48 | Butyl triglycol | 206 |

General Procedure for the Reaction of the Mono-Adducts with Amines Under Formation of Mono-Adduct Ureas:

A four-necked flask equipped with a stirrer, thermometer, dropping funnel, reflux condenser and nitrogen inlet tube is charged with x g of mono-adduct and, with stirring y g of amine is then added dropwise over a period of 1 hour. In this case, the reaction temperature should not exceed 50° C. Optionally, during or after the reaction MPA may be added as a diluent.

| Example | Mono-adduct | Amine |
|---|---|---|
| B1 | 90 g of M1 | 12.8 g of 3-aminopropyl imidazole |
| B2 | 90 g of M1 | 10.3 g of DMAPA |
| B3 | 100 g of M1 | 27.7 g of N,N-bis(3-dimethylaminopropyl)-N-isopropanolamine |
| B4 | 100 g of M2 | 20.4 g of 3-aminopropyl imidazole |
| B5 | 100 g of M2 | 49.3 g of DMAPA |
| B6 | 100 g of M2 | 39.7 g of N,N-bis(3-dimethylaminopropyl)-N-isopropanolamine |
| B7 | 17 g of M3 26 g of MPA | 0.7 g of DMAPA |
| B8 | 30 g of M4 50 g of MPA | 4.4 g of 3-aminopropylimidazole |
| B9 | 30 g of M4 50 g of MPA | 3.5 g of DMAPA |
| B10 | 30 g of M4 50 g of MPA | 3.8 g of 4-aminomethylpyridine |
| B11 | 770 g of M5 | 102 g of DMAPA |
| B12 | 1370 g of M6 | 102 g of DMAPA |
| B13 | 670 g of M7 | 102 g of DMAPA |
| B14 | 1170 g of M8 | 102 g of DMAPA |
| B15 | 1870 g of M9 | 102 g of DMAPA |
| B16 | 2170 g of M10 | 102 g of DMAPA |
| B17 | 3270 g of M11 | 102 g of DMAPA |
| B18 | 5000 g of M12 | 102 g of DMAPA |
| B19 | 1370 M13 | 102 g of DMAPA |
| B20 | 1370 M14 | 102 g of DMAPA |
| B21 | 1570 g of M15 | 102 g of DMAPA |
| B22 | 1070 g of M16 | 102 g of DMAPA |
| B23 | 870 g of M17 | 102 g of DMAPA |
| B24 | 1170 g of M18 | 102 g of DMAPA |
| B25 | 1370 g of M19 | 102 g of DMAPA |
| B26 | 770 g of M20 | 102 g of DMAPA |
| B27 | 1370 g of M21 | 102 g of DMAPA |
| B28 | 1270 g of M22 | 102 g of DMAPA |
| B29 | 2170 g of M23 | 102 g of DMAPA |
| B30 | 2170 g of M24 | 102 g of DMAPA |
| B31 | 1122 g of M26 | 145 g of 1,3-bis-(dimethylamino)-2-propanol |
| B32 | 1122 g of M26 | 355 g of tetramethyliminobis-propylamine |
| B33 | 4974 g of M12 | 144 g of TEA |
| B34 | 974 g of M1 | 102 g of DMAPA |
| B35 | 924 g of M29 | 102 g of DMAPA |
| B36 | 1170 g of M8 | 117 g of DEEA |
| B37 | 1170 g of M8 | 89 g of DMEA |
| B38 | 1274 g of M27 | 102 g of DMAPA |
| B39 | 1574 g of M28 | 102 g of DMAPA |
| B40 | 924 g of M29 | 89 g of DMEA |
| B41 | 1774 g of M30 | 102 g of DMAPA |
| B42 | 3344 g of M31 | 102 g of DMAPA |
| B43 | 2714 g of M32 | 102 g of DMAPA |
| B44 | 2414 g of M33 | 102 g of DMAPA |
| B45 | 1134 g of M34 | 102 g of DMAPA |
| B46 | 2148 g of M35 | 102 g of DMAPA |
| B47 | 3148 g of M36 | 102 g of DMAPA |
| B48 | 442 g of M37 | 102 g of DMAPA |
| B49 | 312 g of M38 | 102 g of DMAPA |
| B50 | 374 g of M39 | 102 g of DMAPA |
| B51 | 332 g of M40 | 102 g of DMAPA |
| B52 | 332 g of M41 | 102 g of DMAPA |
| B53 | 282 g of M42 | 102 g of DMAPA |
| B54 | 274 g of M43 | 102 g of DMAPA |
| B55 | 248 g of M44 | 102 g of DMAPA |
| B56 | 474 g of M45 | 102 g of DMAPA |
| B57 | 674 g of M46 | 102 g of DMAPA |
| B58 | 332 g of M47 | 102 g of DMAPA |
| B59 | 380 g of M48 | 102 g of DMAPA |

MPA = methoxypropyl acetate (solvent);
DMAPA = N,N-dimethylaminopropylamine
TEA = triethanolamine;
DEEA = N,N-diethylethanolamine,
DMEA = N,N-dimethylethanolamine Preparation of a Non-Inventive Comparative Example BX1 without Excess of Diisocyanate A four-necked flask equipped with a stirrer, thermometer, dropping funnel, reflux condenser and nitrogen inlet tube is charged with 174 g of Desmodur T 100 and 2.7 g of benzoyl chloride and mixed thoroughly. 780 g of polyester Y1 are slowly added so that the temperature does not exceed 55° C. After 1.5 h post-reaction the NCO value was 4.3. The reaction mixture is dissolved in 1540 g of MPA. Then, 102 g of DMAPA are added slowly over a period of 1 h such that the temperature does not exceed 50° C. After cooling, the product was cloudy and showed strong separation during storage. The comparable product according to the invention B9, however, is clear and has low viscosity after production and during storage.

General Procedure for the Reaction of the Mono-Adducts with Amines and Polyphosphoric Acid Under Formation of Mono-Adduct Ureas:

A four-necked flask equipped with a stirrer, thermometer, dropping funnel, reflux condenser and nitrogen inlet tube is charged with x g of mono-adduct and, with stirring y g of aminoalcohol is then added dropwise over a period of 1 hour. In this case, the reaction temperature should not exceed 50° C. After 1 hour the temperature is increased to 80° C., and z g of polyphosphoric acid is added. The reaction is complete after 3 hours at 80° C. Optionally, during or after the reaction MPA may be added as a diluent.

| Example | Mono-adduct | Aminoalcohol | Polyphosphoric acid in [g] |
| --- | --- | --- | --- |
| P1 | 100 g of M1 | 6.9 g of EA | 12.7 |
| P2 | 100 g of M2 | 9.9 g of EA | 16.4 |
| P3 | 852 g of M25 | 61 g of EA | 85 |
| P4 | 852 g of M25 | 105 g of DEA | 170 |
| P5 | 1150 g of M26 | 61 g of EA | 85 |
| P6 | 1150 g of M26 | 105 g of DEA | 170 |
| P7 | 1150 g of M26 | 105 g of AEE | 85 |
| P8 | 1072 g of M16 | 61 g of EA | 85 |
| P9 | 1072 g of M16 | 105 g of DEA | 170 |
| P10 | 1072 g of M16 | 105 g of DEA | 85 |
| P11 | 1274 g of M27 | 105 g of DEA | 170 |
| P12 | 1574 g of M15 | 105 g of DEA | 170 |
| P13 | 1574 g of M28 | 105 g of DEA | 170 |
| P14 | 1274 g of M8 | 105 g of DEA | 170 |
| P15 | 974 g of M1 | 105 g of DEA | 170 |
| P16 | 924 g of M29 | 105 g of DEA | 170 |
| P17 | 1774 g of M30 | 105 g of DEA | 170 |
| P18 | 4974 g of M12 | 105 g of DEA | 170 |
| P19 | 4974 g of M12 | 105 g of DEA | 85 |
| P20 | 4974 g of M12 | 144 g of TEA | 170 |
| P21 | 3344 g of M31 | 105 g of DEA | 170 |
| P22 | 2714 g of M32 | 105 g of DEA | 170 |
| P23 | 2414 g of M33 | 105 g of DEA | 170 |
| P24 | 1134 g of M34 | 105 g of DEA | 170 |
| P25 | 2414 g of M3 | 105 g of DEA | 170 |
| P26 | 954 g of M4 | 105 g of DEA | 170 |
| P27 | 770 g of M5 | 105 g of DEA | 170 |
| P28 | 1370 g of M6 | 105 g of DEA | 170 |
| P29 | 670 g of M7 | 105 g of DEA | 170 |
| P30 | 1170 g of M8 | 61 g of EA | 85 |
| P31 | 1870 g of M9 | 105 g of DEA | 170 |
| P32 | 2170 g of M10 | 105 g of DEA | 170 |
| P33 | 3270 g of M11 | 105 g of DEA | 170 |
| P34 | 5000 g of M12 | 61 g of EA | 85 |
| P35 | 1370 M13 | 105 g of DEA | 170 |
| P36 | 1370 M14 | 105 g of DEA | 170 |
| P37 | 870 g of M17 | 105 g of DEA | 170 |
| P38 | 1170 g of M18 | 105 g of DEA | 170 |
| P39 | 1370 g of M19 | 105 g of DEA | 170 |
| P40 | 770 g of M20 | 105 g of DEA | 170 |
| P41 | 1370 g of M21 | 105 g of DEA | 170 |
| P42 | 1270 g of M22 | 105 g of DEA | 170 |
| P43 | 2170 g of M23 | 105 g of DEA | 170 |
| P44 | 2170 g of M24 | 105 g of DEA | 170 |
| P45 | 2148 g of M35 | 105 g of DEA | 170 |
| P46 | 3148 g of M36 | 105 g of DEA | 170 |
| P47 | 442 g of M37 | 61 g of EA | 85 |
| P48 | 312 g of M38 | 105 g of DEA | 170 |
| P49 | 374 g of M39 | 61 g of EA | 85 |
| P50 | 332 g of M40 | 61 g of EA | 85 |
| P51 | 332 g of M41 | 61 g of EA | 85 |
| P51 | 282 g of M42 | 61 g of EA | 85 |
| P53 | 274 g of M43 | 61 g of EA | 85 |
| P54 | 248 g of M44 | 105 g of DEA | 170 |
| P55 | 474 g of M45 | 105 g of DEA | 170 |
| P56 | 674 g of M46 | 105 g of DEA | 170 |
| P57 | 332 g of M47 | 105 g of DEA | 170 |
| P58 | 380 g of M48 | 105 g of DEA | 170 |

EA = ethanolamine;
DEA = diethanolamine;
AEE = 2-(2-aminoethoxy) ethanol
TEA = triethanolamine Preparation of a Non-Inventive Comparative Example PX1

950 g of a MPEG 350-initiated polyester made of ε-caprolactone and 5-valerolactone in the molar ratio 3:1, Mn=950 and 85 g of polyphosphoric acid are stirred at 80° C. for 3 hours.

Preparation of a Non-Inventive Comparative Example PX2

950 g of a butanol-initiated EO/PO polyether (EO:PO 1:1), Mn 4800 and 85 g of polyphosphoric acid are stirred at 80° C. for 3 hours.

General Procedure for the Quaternization:

In a four-necked flask equipped with a stirrer, thermometer, dropping funnel, reflux condenser and nitrogen inlet tube, mono-adduct urea 40 g of MPA (methoxypropyl acetate) and 40 g of butyl glycol, and x g of alkylating agent are reacted for 4 hours at 120° C. The solid is adjusted with a 1:1 mixture of MPA and butyl glycol to 40%.

| Example | Mono-adduct urea | Alkylating agent |
| --- | --- | --- |
| Q1 | 60 g of Example 2 | 6.9 g of benzyl chloride |
| Q2 | 52 g of Example 2 | 14.7 g of Grilonite 1814<br>6.4 g of benzoic acid |
| Q3 | 60 g of Example 5 | 9.5 g of benzyl chloride |
| Q4 | 43 g of Example 5 | 16.8 g of Grilonite 1814<br>7.3 g of benzoic acid |

Grilonite RV 1814 = $C_{13}/C_{15}$-alkyl glycidyl ether, EMS-Chemie

General Procedure for Salification:

In a four-necked flask equipped with a stirrer, thermometer, dropping funnel, reflux condenser and nitrogen inlet tube, mono-adduct urea in 40 g of MPA and 40 g of butyl glycol with x g of salification agent is stirred for 1 h at 60° C.

| Example | Compound used | Salification agent |
| --- | --- | --- |
| S1 | 1377 g of P9 | 234 g of DEEA |
| S2 | 1377 g of P9 | 178 g of DMEA |
| S3 | 1377 g of P9 | 346 g of N,N-dibutyl ethanolamin |
| S4 | 1277 g of P10 | 117 g of DEEA |
| S5 | 1480 g of P11 | 149 g of TEA |
| S6 | 1570 g of P14 | 1400 g of Copolymer1 |
| S7 | 1280 g of P15 | 1600 g of Copolymer2 |
| S8 | 5280 g of P18 | 1400 g of Copolymer1 |
| S9 | 5280 g of P18 | 1600 g of Copolymer2 |
| S10 | 5180 g of P19 | 700 g of Copolymer1 |
| S11 | 5180 g of P19 | 800 g of Copolymer2 |
| S12 | 1076 g of B2 | 146 g of adipinic acid |

-continued

| Example | Compound used | Salification agent |
|---|---|---|
| S13 | 52 g of B2 | 6.4 g of benzoic acid |
| S14 | 43 g of B5 | 7.3 g of benzoic acid |
| S15 | 1272 g of B14 | 73 g of adipinic acid |
| S16 | 1272 g of B14 | 282 g of oleic acid |
| S17 | 1272 g of B14 | 200 g of lauric acid |
| S18 | 1272 g of B14 | 298 g of ricinoleic acid |
| S19 | 1026 g of B35 | 60 g of acetic acid |
| S20 | 685 g of P47 | 700 Copolymer1 |
| S21 | 520 g of P49 | 700 g of Copolymer1 |
| S22 | 2445 g of P43 | 1400 g of Copolymer1 |
| S23 | 2445 g of P43 | 700 g of Copolymer1 |
| S24 | 1145 g of P37 | 2545 g of B14 |
| S25 | 1145 g of P37 | 1270 g of B14 |
| S26 | 2690 g of P25 | 120 g of B4 |
| S27 | 2690 g of P25 | 150 g of B5 |
| S28 | 590 g of P48 | 85 g of B8 |
| S29 | 655 g of P58 | 85 g of B9 |

DEEA = N,N-diethylethanolamine;
DMEA = N,N-dimethylethanolamine

Copolymer 1 (Basic GTP Block Copolymer)

Under a stream of nitrogen, a three-necked flask equipped with stirrer, reflux condenser and a gas inlet is charged with 69.70 g of MPA at 20° C. and mixed with 7.70 g of butyl methacrylate. Then, 3.75 g of 1-trimethylsiloxy-1-methoxy-2-methylpropene and 0.375 g of tetrabutylammonium m-chlorobenzoate are added via syringe through a septum. Within 30 min, 60.00 g of butyl methacrylate are added. The reaction temperature rises to 40° C. and is kept at this level by cooling. After the addition of butyl methacrylate, 32.80 g of N,N-dimethylaminoethyl methacrylate are added within 20 min, ensuring by cooling again that the temperature does not rise above 40° C. After stirring for 30 min, 3 ml of ethanol are added. The monomers were reacted completely (residual monomer content determined by HPLC); product: $M_n$=9100 g/mol, according to GPC.

Copolymer 2 (Basic NMP Block Copolymer)

Under a stream of nitrogen, a three-necked flask equipped with stirrer, reflux condenser and gas inlet is charged with 47.2 g of MPA, and 3.81 g of 2-[N-tert-butyl-N-[1-diethyl-phosphono-(2,2-dimethylpropyl)]-nitroxy]-2-methyl-propanoic acid and 46.00 g of butyl acrylate in a three-necked round bottom flask, and heated to 120° C. Stirring is continued for 2.5 h at 120° C. Thereafter, 21.00 g of N,N-dimethylaminoethyl methacrylate is metered in at a rate of 2 ml/min. Thereafter, stirring is continued for a further 6 h at 120° C.; the conversion is then about 98% (residual monomer content determined by HPLC); product: $M_n$=3000 g/mol, according to GPC.

c) Application Testing

Use of the polymers according to the invention as wetting agent and dispersant for producing pigment concentrates and their use in paint systems Starting Materials Uralac SN 831 polyester resin, manufacturer DSM Resins
Cymel 303 melamine-formaldehyde resin, manufacturer: Cytec Industries
Dynapol Catalyst 1203 catalyst, manufacturer Evonik Degussa
Ti Pure R960 titanium dioxide pigment, manufacturer Du Pont
Aerosil R972 hydrophobic fumed silica, manufacturer Degussa
BYK 057 silicone-free polymeric defoamer from BYK-Chemie
BYK 355 acrylic leveling additive, manufacturer BYK-Chemie
Solvesso 150 ND,
Solvesso 100 aromatic solvents from ExxonMobil
MPA 1-methoxy-2-propyl acetate Working Procedures
Producing Paints
Grinding Conditions:
Device: Lau Paint Shaker DAS H [/A]200-K
Grinding time: 60 min, normal speed, maximum cooling
Ratio of ground material to glass beads (1 mm diameter):1:1 (parts by weight)
Composition of the Pigment Concentrates:

|  | Ti pure R960 | Special black 4 |
|---|---|---|
| Uralac SN831 | 26.2 | 44.0 |
| Additive 100% a.S. | 1.7 | 3.6 |
| MPA | 5.0 | 5.0 |
| Solvesso 150ND | 11.2 | 17.5 |
| Aerosil R972 | 0.6 | 0.3 |
| BYK-057 | 0.3 |  |
| Ti pure R960 | 55.0 |  |
| Special black 4 (carbon black, Firma Evonik) |  | 12.0 |

Special black 4: pigment carbon black from Evonik

Production of the Test Formulations
Composition of the Clear Varnish

| Clear varnish | |
|---|---|
| Uralac SN 831 | 64.0 |
| Cymel 303 | 13.8 |
| Dynapol Catalyst 1203 | 4.9 |
| BYK-057 | 0.4 |
| BYK-355 | 1.1 |
| Solvesso 150ND | 10.5 |
| MPA | 5.3 |
|  | 100.0 |

Composition of the Test Formulations

|  | White:black 97:3 |
|---|---|
| Clear varnish | 19.8 |
| Ti pure R960 | 26.5 |
| Special black 4 | 3.7 |
|  | 50.0 |

Following the production, the viscosity of the test formulations was adjusted to 90-110 sec (DIN 4 flow cup, 23° C.) with Solvesso 150ND.

A portion of the test formulation is stored at 50° C. for 1 week.

Application of the Test Formulation

The test formulations were applied to substrates on the day of the preparation under the following conditions.

Substrates: Alcan aluminum sheets, pre-coated with an approximately 5 micron thick PU primer layer
Blade application: 80 μm (wet)
Oven temperature: 320° C.
Baking time: 30 s
max. metal temperature: 235° C.
Dry film thickness: 18-20 μm The flooding, floating and flocculation properties were evaluated as follows.

The respective test formulation was divided into 2 portions.

Each first portion of the respective test formulation was stirred with a toothed disc at 6000 rpm for 1 minute and then immediately applied to the right half of the surface of the substrate. Simultaneously, the second portion of each of the respective test formulation was applied without prior stirring to the left half of the surface of the substrate.

Rub-Out Test

Immediately after application, the freshly applied paint layers on both halves of the surface of the substrate were subjected to a rub-out test. For this purpose, some areas of the fresh paint layers were mechanically rubbed following the application and then the color change caused by the rubbing (rub-out effect) was measured over the paint that has not been rubbed. Causes of the rub-out effect are, for example, flocculation and/or floating of pigments. If pigment flocculates are present, they will be destroyed by the shearing action when rubbed, and the originally targeted shade forms. The rub-out effect can be minimized by suitable dispersants and is thus a measure of the effectiveness of a dispersant.

Colorimetric Measurements

Device: color guide, BYK-Gardner

Light type: standard light D65 (daylight)

Measuring field: 10°

Measuring geometry: d/8° spin (diffuse illumination, observation angle 8°)

Number of measurements: n=3

The results of the colorimetry are shown in the following table. The ΔE value determined for a formulation indicates the color difference between the rubbed and the non-rubbed areas of the coating (rub-out effect).

ΔE1=ΔE not stirred

ΔE2=ΔE stirred

ΔE3=ΔE not stirred/stirred

|  | ΔE1 | ΔE2 | ΔE3 | Gloss 60° | Viscosity of the black pigment concentrate |
|---|---|---|---|---|---|
| After grinding | | | | | |
| B5 | 0.63 | 0.53 | 0.05 | 88 | low |
| B8 | 0.40 | 0.51 | 0.04 | 89 | low |
| B9 | 0.61 | 0.46 | 0.04 | 93 | low |
| B10 | 0.65 | 0.55 | 0.06 | 86 | low |
| BX1 (non-inventive) | 0.75 | 0.66 | 0.1 | 84 | high |
| S6 | 0.65 | 0.59 | 0.06 | 85 | low |
| S7 | 0.64 | 0.58 | 0.07 | 85 | low |
| S8 | 0.59 | 0.57 | 0.05 | 86 | low |
| S9 | 0.54 | 0.49 | 0.05 | 86 | low |
| P19 | 0.71 | 0.75 | 0.08 | 84 | low |
| P20 | 0.65 | 0.63 | 0.06 | 85 | low |
| PX2 (non-inventive) | 0.98 | 1.02 | 0.18 | 79 | high |
| After 1 week of storage at 50° C. | | | | | |
| B5 | 0.60 | 0.51 | 0.05 | 88 | low |
| B8 | 0.40 | 0.51 | 0.05 | 92 | low |
| B9 | 0.39 | 0.39 | 0.07 | 96 | low |
| B10 | 0.65 | 0.55 | 0.06 | 86 | low |
| BX1 | 0.82 | 0.71 | 0.12 | 82 | high |
| S6 | 0.64 | 0.58 | 0.06 | 86 | low |
| S7 | 0.62 | 0.57 | 0.06 | 84 | low |
| S8 | 0.58 | 0.59 | 0.05 | 85 | low |
| S9 | 0.52 | 0.47 | 0.05 | 87 | low |
| P19 | 0.70 | 0.74 | 0.07 | 84 | low |
| P20 | 0.65 | 0.62 | 0.06 | 85 | low |
| PX2 | 1.23 | 1.22 | 0.26 | 76 | high |
| After rubbing | | | | | |
| S20 | 0.69 | 0.62 | 0.08 | 86 | low |
| S22 | 0.48 | 0.55 | 0.04 | 90 | low |
| S24 | 0.67 | 0.51 | 0.05 | 91 | low |
| S26 | 0.65 | 0.62 | 0.06 | 87 | low |

Formulation: Paraloid B 66 (Thermoplastic Acrylate from Dow Chemicals)

Ground Material:

| | |
|---|---|
| Paraloid B 66 (50% in xylene) | 25.00 |
| DIDP | 2.00 |
| Xylene | 3.5 |
| MPA | 2.50 |
| Additive | 1.5 |
| Aerosil R 972 | 0.50 |
| Pigment | 65.00 |
| Total | 100.00 |

Paraloid B 66 = thermoplastic acrylate resin from Dow Chemicals
DIDP = diisodecyl phthalate Let-Down:

| | |
|---|---|
| Ground stock paste | 38.50 |
| Paraloid B 66 | 50.00 |
| MPA | 3.40 |
| Xylene | 8.00 |
| BYK-306 | 0.10 |

BYK-306: silicone additive from Byk-Chemie

Results Paraloid B 66

| | Pigments | | | | | | | | |
|---|---|---|---|---|---|---|---|---|---|
| | Kronos 2310 | | | Tioxide TR 92 | | | Ti-Pure R 960 | | |
| Additives | Viscosity | ΔE | Gloss | Viscosity | ΔE | Gloss | Viscosity | ΔE | Gloss |
| PX1 | 3 | 4.5 | 85 | 4 | 2.5 | 83 | 4 | 3.9 | 73 |
| PX2 | 4 | 5.1 | 81 | 5 | 3.1 | 79 | 5 | 5.7 | 63 |
| P6 | 2 | 3.3 | 91 | 3 | 1.1 | 86 | 2 | 2.5 | 80 |
| P18 | 2 | 2.5 | 95 | 3 | 0.5 | 88 | 1 | 2.1 | 83 |

Kronos 2310: titanium dioxide pigment with basic surface
Tioxide TR 92: titanium dioxide pigment with basic surface
Ti-Pure R 960: titanium dioxide pigment with acidic surface
Viscosity: 1-5, 1 = low, 5 = high Formulation: Macrynal SM 510 (2-K Acryl)
Ground Material:

| Macrynal SM 510 | 22.22 |
|---|---|
| MPA | 2.00 |
| Solvesso 100 | 2.00 |
| Xylene | 3.00 |
| Butyl acetate | 3.5 |
| BYK-066 N | 0.30 |
| Additive | 1.5 |
| Aerosil R 972 | 0.50 |
| Pigment | 65.00 |
| Total | 100.00 |

Macrynal SM 510 = polyacrylate resin from Cytec
BYK-066 N: Silicone defoamer from Byk-Chemie Let-Down:

| Ground material paste | 38.50 |
|---|---|
| Macrynal SM 510 | 45.00 |
| MPA | 1.00 |
| Solvesso 100 | 7.00 |
| Xylene | 1.40 |
| Butyl acetate | 7.00 |
| BYK-306 | 0.10 |

BYK-306: silicone-containing surface additive from Byk-Chemie
Base to hardener: 2:1

Hardener Solution

| Desmodur N 75 | 25.0 |
|---|---|
| Butyl acetate | 8.70 |
| Solvesso 100 | 8.80 |
| MPA | 2.50 |
| Xylene | 5.00 |
| Total | 50.00 |

Desmodur N 75: aliphatic polyisocyanate (HDI biuret) from Bayer, 75% in MPA

Results: Macrynal SM 510

Formulation: Setalux 1756 VV 65
Ground Material:

| Setalux 1756 VV-65 | 22.22 |
|---|---|
| Additive | 1.5 |
| Solvesso 100 | 5.5 |
| Xylene | 5.28 |
| Aerosil R 972 | 0.50 |
| Pigment | 65.00 |
| Total | 100.00 |

Setalux 1756 VV-65: hydroxyacrylate copolymer from Nuplex, 50% in xylene/butanol Let-Down:

| Ground material paste | 38.50 |
|---|---|
| Setalux 1756 VV-65 | 40.00 |
| Setamine US 138-BB 70 | 16.00 |
| Solvesso 100 | 3.00 |
| Xylene | 2.30 |
| BYK-310 | 0.20 |
| Total | 100.00 |

Setamine US 138-BB 70: melamine resin from Nuplex
BYK-310: polyester-modified polydimethylsiloxane from BYK-Chemie Pigment/binder: 0.8:1 in the paint Mixing: 29.5 g of clear varnish+0.5 g of black paste Baking conditions: drying for 10 minutes
20 minutes at 140° C.

Results: Setalux 1756 VV 65

| | Pigments | | | | | | | | |
|---|---|---|---|---|---|---|---|---|---|
| | Kronos 2310 | | | Tioxide TR 92 | | | Ti-Pure R 960 | | |
| Additives | Viscosity | ΔE | Gloss | Viscosity | ΔE | Gloss | Viscosity | ΔE | Gloss |
| PX1 | 5 | 1.2 | 85 | 5 | 1.1 | 84 | 5 | 1.6 | 86 |
| PX2 | 5 | 1.3 | 84 | 5 | 1.6 | 81 | 5 | 5.7 | 82 |
| P6 | 2 | 0.6 | 95 | 1 | 0.3 | 90 | 2 | 0.7 | 91 |
| P18 | 1 | 0.5 | 91 | 2 | 0.6 | 93 | 1 | 0.5 | 95 |
| S6 | 1 | 0.5 | 94 | 1 | 0.5 | 92 | 2 | 0.7 | 90 |
| S9 | 1 | 0.4 | 92 | 1 | 0.6 | 92 | 1 | 0.5 | 94 |

| | Pigments | | | | | | | | |
|---|---|---|---|---|---|---|---|---|---|
| | Kronos 2310 | | | Tioxide TR 92 | | | Ti-Pure R 960 | | |
| Additives | Viscosity | ΔE | Gloss | Viscosity | ΔE | Gloss | Viscosity | ΔE | Gloss |
| PX1 | 5 | 1.2 | 89 | 4 | 1.3 | 89 | 5 | 0.9 | 88 |
| PX2 | 5 | 1.5 | 84 | 5 | 1.7 | 88 | 5 | 1.6 | 84 |
| P6 | 1 | 0.6 | 95 | 1 | 0.3 | 92 | 2 | 0.5 | 93 |
| P18 | 1 | 0.3 | 98 | 1 | 0.6 | 98 | 1 | 0.3 | 96 |
| P22 | 1 | 0.7 | 95 | 1 | 0.3 | 92 | 2 | 0.3 | 94 |
| S6 | 1 | 0.6 | 91 | 2 | 0.9 | 90 | 2 | 0.4 | 93 |
| S9 | 1 | 0.8 | 94 | 1 | 0.8 | 91 | 1 | 0.3 | 94 |
| BX1 | 4 | 1.0 | 89 | 3 | 1.3 | 88 | 4 | 0.9 | 90 |
| B9 | 3 | 0.8 | 91 | 2 | 1.1 | 91 | 3 | 0.7 | 93 |
| B34 | 3 | 0.9 | 90 | 2 | 1.0 | 90 | 3 | 0.8 | 95 |

Additional Results with Setalux 1756 VV 65

| Pigment | Ti-Pure R 960 | | |
|---|---|---|---|
| Additives | Viscosity | Δ E | Gloss |
| P26 | 1 | 0.6 | 95 |
| P28 | 1 | 0.5 | 94 |
| P37 | 1 | 0.7 | 92 |
| P38 | 1 | 0.4 | 96 |
| P39 | 1 | 0.7 | 95 |
| P41 | 1 | 0.6 | 92 |
| P43 | 2 | 0.8 | 92 |
| P47 | 3 | 0.9 | 90 |
| S22 | 1 | 0.6 | 94 |
| S24 | 2 | 0.8 | 91 |
| S26 | 2 | 0.7 | 93 |
| S28 | 3 | 0.9 | 90 |

CONCLUSION OF THE EXAMPLES

The generally very good quality of the additive composition according to the invention is shown in gloss, viscosity and rub-out effect. Particularly noteworthy is the good universality with respect to acidic and basic pigment particles to be dispersed (see, inter alia, "Results Paraloid B 66"—according to the above table). The additive composition according to the invention also differs positively by providing beneficial effects regarding solubility behavior, gloss and rub-out effect, which are alone caused by the particular technology of the method according to the invention (use of excess TDI, followed by removal of unreacted TDI).

The invention claimed is:
1. A method for producing an additive composition, comprising the steps i) to iii), wherein
in step i) a hydroxy component of formula (I)

$$Y(-OH)_q \quad (I)$$

or mixtures thereof,
wherein
Y is the same or different and is represented by a branched or unbranched, saturated or unsaturated organic radical having 1 to 1000 carbon atoms,
q is the same or different and represented by an integer from 1 to 10
is reacted with a diisocyanate of formula (II) having NCO groups of different reactivity $$R^1(NCO)_2 \quad (II)$$

or mixtures thereof,
wherein
$R^1$ is the same or different and is represented by a hydrocarbon radical having 6 to 20 carbon atoms, comprising an arylene group, a branched or unbranched alkylarylene group, and/or an acyclic, cyclic, branched or unbranched alkylene group,
wherein the diisocyanate of formula (II) is used with respect to the hydroxy component of formula (I) in a molar ratio of at least (1.1*arithmetic mean of q):1.0, so that an isocyanate adduct of formula (III)

$$Y(-O-CO-NH-R^1-NCO)_q \quad (III)$$

or mixtures thereof,
wherein
Y, q and $R^1$ are each as described above,
and unreacted diisocyanate of formula (II) containing reaction mixture is formed,
in step ii) at least 50 mol % of the unreacted portion of the diisocyanate of formula (II) is removed from the reaction mixture,
in step iii) a compound of formula (IV) having at least one head group radical $Z^1$ $$Y(-O-CO-NH-R^1-NH-CO-X-Z^1)_q \quad (IV)$$

or mixtures thereof,
wherein
Y, q and $R^1$ are each as described above,
X is the same or different and is represented by O, NH and/or $NZ^2$
wherein
$Z^2$ is the same or different and is represented by a branched or unbranched, saturated or unsaturated organic radical,
$Z^1$ is the same or different and is represented by a branched or unbranched, saturated or unsaturated organic radical having at least two carbon atoms having at least one head group which is present in salifiable or salified form, and is selected from the group consisting of tertiary amino functions, quaternary ammonium functions, phosphoric acid ester functions, and carboxylic acid functions,
wherein step iii) is carried out in a single stage iii-a) or a sequence of steps iii-b),
in step iii-a) the isocyanate adduct of formula (III) present in the reaction mixture is reacted with an isocyanate-reactive compound of formula (V) having said head group radical $Z^1$, $$HX-Z^1 \quad (V)$$

wherein
X and $Z^1$ are each as described above,
and in the sequence of steps iii-b), first, the isocyanate adduct of the formula (III) which is present in the reaction mixture is reacted with a compound having a isocyanate-reactive group HX and at least one further functional group Q, wherein then Q is reacted with a reagent involved in the generation of the head group radical $Z^1$ to form the head group radical $Z^1$.

2. The method according to claim 1, characterized in that q is the same or different and is represented by an integer from 1 to 5.

3. A method for the preparation of an additive composition according to claim 1, characterized in that q=1, so that in the method including steps i) to iii)

in step i) as a hydroxy component a monohydroxy compound of formula (Ia)

$$Y\text{—}OH \quad \text{(Ia)}$$

or mixtures thereof,
wherein
Y is the same or different and is represented by a branched or unbranched, saturated or unsaturated organic radical having 1 to 1000 carbon atoms
is reacted with a diisocyanate of formula (II) having NCO groups of different reactivity $$R^1(NCO)_2 \quad \text{(II)}$$

or mixtures thereof,
wherein
$R^1$ is the same or different and is represented by a hydrocarbon radical having 6 to 20 carbon atoms, comprising an arylene group, a branched or unbranched alkylarylene group, and/or an acyclic, cyclic, branched or unbranched alkylene group,
wherein the diisocyanate of formula (II) is used with respect to the monohydroxy component of formula (Ia) in a molar ratio of at least 1.1:1.0, so that a monoisocyanate adduct of formula (IIIa)

$$Y\text{—}O\text{—}CO\text{—}NH\text{—}R^1\text{—}NCO \quad \text{(IIIa)}$$

or mixtures thereof,
wherein
Y and $R^1$ are each as described above,
and unreacted diisocyanate of formula (II) containing reaction mixture is formed,
in step ii) at least 50 mol % of the unreacted portion of the diisocyanate of formula (II) is removed from the reaction mixture,
in step iii) a compound of formula (IVa) having at least one head group radical $Z^1$ $$Y\text{—}O\text{—}CO\text{—}NH\text{—}R^1\text{—}NH\text{—}CO\text{—}X\text{—}Z^1 \quad \text{(IVa)}$$

or mixtures thereof,
wherein
Y and $R^1$ are each as described above,
X is the same or different and is represented by O, NH and/or $NZ^2$
wherein
$Z^2$ is the same or different and is represented by a branched or unbranched, saturated or unsaturated organic radical,
$Z^1$ is the same or different and is represented by a branched or unbranched, saturated or unsaturated organic radical having at least two carbon atoms having at least one head group which is present in salifiable or salified form, and is selected from the group consisting of tertiary amino functions, quaternary ammonium functions, phosphoric acid ester functions, and carboxylic acid functions, wherein step iii) is carried out in a single stage iii-a) or a sequence of steps iii-b),
in step iii-a) the monoisocyanate adduct of formula (IIIa) present in the reaction mixture is reacted with an isocyanate-reactive compound of formula (V) having said head group radical $Z^1$, $$HX\text{—}Z^1 \quad \text{(V)}$$

wherein
X and $Z^1$ are each as described above,
and in the sequence of steps iii-b), first, the monoisocyanate adduct of the formula (IIIa) which is present in the reaction mixture is reacted with a compound having a isocyanate-reactive group HX and at least one further functional group Q, wherein then Q is reacted with a reagent involved in the generation of the head group radical $Z^1$ to form the head group radical $Z^1$.

4. The method according to claim 1, characterized in that Y contains at least one polyether radical, polyester radical, hydrocarbon radical, and/or polysiloxane radical.

5. The method according to claim 1, characterized in that Y in total contains 1 to 450 ether oxygen atoms, which optionally are contained in radicals of polytetrahydrofuran, polyoxetanes and/or polyoxiranes.

6. The method according to claim 1, characterized in that Y in total contains 3 to 400 ether oxygen atoms, wherein at least 50 mol % of the ether oxygen atoms are present in ethylene oxide and/or propylene structural units.

7. The method according to claim 1, characterized in that $R^1$ is the same or different and is a tolyl group and/or an isophoronyl group.

8. The method according to claim 1, characterized in that the diisocyanate of formula (II) is present as toluene-2,4-diisocyanate and/or isophorone diisocyanate.

9. The method according to claim 1, characterized in that the head group of the head group radical $Z^1$ is present in the form of a phosphoric acid ester function, step iii) is carried out in the form of a sequence of steps iii-b), wherein the further functional group Q is present in the form of a hydroxyl group and the reagent involved in the generation of the head group moiety $Z^1$ is present as a phosphorylization agent.

10. The method according to claim 1, characterized in that the head group radical $Z^1$ has a phosphoric acid ester function as a head group, wherein $Z^1$ is the same or different and is represented by formula (VII)

$$R^2\text{—}O\text{—}PO(OR^3)_n(OH)_{2-n} \quad \text{(VII)}$$

wherein
$R^2$ is the same or different and is represented by a branched or unbranched, saturated or unsaturated organic radical having at least two carbon atoms,
$R^3$ is the same or different and is represented by a branched or unbranched, saturated or unsaturated organic radical; and
n is the same or different and is represented by 0 and/or 1.

11. The method according to claim 10, characterized in that n is equal to 0 and $R^2$ is the same or different and is represented by a saturated, linear $C_2$-$C_{40}$-alkylene radical.

12. The method according to claim 1, characterized in that the head group of the head group radical $Z^1$ is the same or different and is present as tertiary amino function or quaternary ammonium function.

13. The method according to claim 1, characterized in that $Z^2$ is the same or different and is represented by a $C_1$-$C_{50}$-organic radical having optionally ether oxygen atoms, and/ or includes the equivalent of $Z^1$, with the proviso that $Z^1$ and $Z^2$ each are represented independently from one another.

14. The method according to claim 1, characterized in that X is the same or different and is represented by NH and/or $NZ^2$.

15. The method according to claim 1, characterized in that $Z^1$ and $Z^2$ each are represented independently from one another by radicals which in each case are either only relatively weakly reactive or inert towards isocyanates.

16. The method according to claim 1, characterized in that in step i) the diisocyanate of formula (II) is used with respect to the hydroxy component of formula (I) in a molar ratio of at least (1.5*arithmetic mean of q):1.0.

17. The method according to claim 1, characterized in that in step ii) at least 75 mol % of the unreacted portion of the diisocyanate of formula (II) is removed from the reaction mixture.

18. The method according to claim 3, characterized in that the molar ratio of the monohydroxy compounds of formula (Ia) reacted in total in step i) to the sum of the compounds of formula (V) reacted in step iii) and the compounds reacted in step iii) containing a isocyanate-reactive group HX and at least one further functional group Q, is 0.9 to 1.1.

19. The method according to claim 3, characterized in that in step iii) as much compounds of formula (V) and/or as much compounds having one isocyanate-reactive group HX and at least one further functional group Q, is used, that at least 90 mol % of the monoisocyanate adduct of formula (IIIa) formed in step i) is reacted.

20. The method according to claim 3, characterized in that in step i) the diisocyanate of formula (II) with respect to the monohydroxy compound of formula (Ia) is used in a molar ratio of at least 1.5:1.0.

21. An additive composition prepared by the method according to claim 1.

22. The additive composition of claim 21, containing
  i) 10 to 99.98% by weight of the compound according to formula (IVa) Y—O—CO—NH—$R^1$—NH—COX—$Z^1$,
  ii) 0.01 to 10% by weight diurethane according to formula Y—O—CO—NH—$R^1$—NH—CO—O—Y, wherein Y is the same or different,
  iii) 0.01 to 10% by weight diurea of formula $Z^1$—X—CO—NH—$R^1$—NH—CO—X—$Z^1$, wherein $Z^1$ is the same or different; and
  iv) 0 to 8% by weight urethane of formula Y—O—CO—NH—$R^1$—NCO.

23. A process comprising utilizing an additive composition according to claim 21 as an additive, optionally as a wetting agent and dispersant in coatings, paints, plastics, pigment pastes, sealants, cosmetics, ceramics, adhesives, casting compounds, fillers, printing colors and inks.

24. A solid mixture containing particles and/or fibers that have been treated with an additive composition according to claim 21.

25. Paint and/or plastic, containing an additive composition according to claim 21.

26. A process comprising utilizing an additive composition according to claim 22 as an additive, optionally as a wetting agent and dispersant in coatings, paints, plastics, pigment pastes, sealants, cosmetics, ceramics, adhesives, casting compounds, fillers, printing colors and inks.

27. A solid mixture containing particles and/or fibers that have been treated with an additive composition according to claim 22.

28. Paint and/or plastic, containing an additive composition according to claim 22.

29. The method according to claim 20, characterized in that in step i) the diisocyanate of formula (II) with respect to the monohydroxy compound of formula (Ia) is used in a molar ratio of 2.5:1 to 20:1.

30. The method according to claim 1, wherein the removal from the reaction mixture in step ii) of the at least 50 mol % of the unreacted portion of the diisocyanate of formula (II), minimizes by-product formation in step iii).

* * * * *